(12) United States Patent
Kimura et al.

(10) Patent No.: US 9,009,124 B2
(45) Date of Patent: Apr. 14, 2015

(54) COMPRESSION AWARE PHYSICAL DATABASE DESIGN

(75) Inventors: Hideaki Kimura, Providence, RI (US); Vivek Narasayya, Redmond, WA (US); Manoj Syamala, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 806 days.

(21) Appl. No.: 13/163,589

(22) Filed: Jun. 17, 2011

(65) Prior Publication Data
US 2012/0323929 A1     Dec. 20, 2012

(51) Int. Cl.
G06F 17/30     (2006.01)

(52) U.S. Cl.
CPC .... *G06F 17/30339* (2013.01); *G06F 17/30578* (2013.01); *G06F 17/30592* (2013.01)

(58) Field of Classification Search
CPC .............. G06F 17/30592; G06F 17/30339; G06F 11/1658; G06F 11/2097; G06F 17/30578
USPC ......... 707/696, 748, 798, 640, 661, 674, 792; 709/201
See application file for complete search history.

(56) References Cited

U.S. PATENT DOCUMENTS

| | | | | |
|---|---|---|---|---|
| 6,098,078 | A * | 8/2000 | Gehani et al. ................ | 707/610 |
| 6,317,754 | B1 * | 11/2001 | Peng ............................ | 707/610 |
| 6,539,381 | B1 * | 3/2003 | Prasad et al. ................ | 707/770 |
| 7,133,876 | B2 * | 11/2006 | Roussopoulos et al. ...... | 707/752 |
| 7,676,788 | B1 * | 3/2010 | Ousterhout et al. .......... | 717/106 |
| 2005/0219076 | A1 | 10/2005 | Harris | |
| 2009/0248725 | A1 | 10/2009 | Bhattacharjee et al. | |
| 2012/0158696 | A1 * | 6/2012 | Arasu et al. .................. | 707/715 |
| 2012/0173548 | A1 * | 7/2012 | Bayliss ........................ | 707/749 |
| 2012/0290585 | A1 * | 11/2012 | Bayliss ........................ | 707/748 |

OTHER PUBLICATIONS

Idreos, et al., "Estimating the compression fraction of an index using sampling", Retrieved Apr. 1, 2011 at <<http://research.microsoft.com/pubs/117946/429.pdf>>, International Conference on Data Engineering (ICDE), Mar. 1, 2010, 4 Pages.

Al-Bahadili, et al., "A compressed index-query web search engine model", Retrieved Apr. 1, 2011 at <<http://www.uop.edu.jo/download/Research/members/382_1633_A_Compressed_Index-Query_Web_Search_Engine_Model.pdf>>, International Journal of Computer Information Systems, vol. 01, No. 4, 2010, pp. 75-81.

Chierichetti, et al., "Compressed web indexes", Retrieved Apr. 1, 2011 at <<http://obuisson.free.fr/biblio/similarity_search_techniques/CompressedIndex/p451.pdf>>, The 18th International World Wide Web Conference, Apr. 20-24, 2009, pp. 451-460.

(Continued)

*Primary Examiner* — Shahid Alam
(74) *Attorney, Agent, or Firm* — Judy Yee; Sandy Swain; Micky Minhas

(57) ABSTRACT

A plurality of indicators representing a plurality of respective candidate database configurations may be obtained, each of the candidate database configurations including a plurality of database queries and a plurality of candidate database indexes associated with a database table. A portion of the candidate database indexes included in the plurality of database indexes may be selected based on skyline selection. An enumeration of the portion of the plurality of the candidate database indexes may be determined based on a greedy algorithm.

20 Claims, 20 Drawing Sheets

(56) References Cited

OTHER PUBLICATIONS

Mishra, Sanjay, "Data Compression: Strategy, Capacity Planning and Best Practices", Retrieved Apr. 1, 2011 at <<http://msdn.microsoft.com/en-us/library/dd894051(v=sql.100).aspx>>, May 2009, 14 Pages.

Bhattacharjee, et al., "Efficient index compression in DB2 LUW", Retrieved Apr. 1, 2011 at <<http://www2.hawaii.edu/~lipyeow/pub/vldb09-indexcompression.pdf>>, Proceedings of the VLDB, vol. 02, No. 2, Aug. 2009, 12 Pages.

Wu, et al., "Optimizing Bitmap Indices With Efficient Compression", Retrieved Apr. 1, 2011 at <<http://crd.lbl.gov/~kewu/ps/LBNL-49626-tods.pdf>>, ACM Transactions on Database Systems (TODS), vol. 31, No. 1, Mar. 2006, pp. 1-36.

Pöss, et al., "Data compression in Oracle", Retrieved May 26, 2011 at <<http://citeseerx.ist.psu.edu/viewdoc/download?doi=10.1.1.3.8511&rep=rep1&type=pdf>>, In Proc. of 29th VLDB Conf ( 2003), 11 Pages.

Iyer, et al., "Data Compression Support in Database", Retrieved May 26, 2011 at <<http://www.vldb.org/conf/1994/P695.PDF>>, In VLDB ( 1994), 10 Pages.

Chaudhui, et al., "An Efficient Cost-Driven Index Selection Tool for Microsoft SQL Server", Retrieved May 26, 2011 at <<http://www.vldb.org/conf/1997/P146.PDF>>, In VLDB ( 1997), 10 Pages.

Agrawal, et al., "Automated Selection of Materialized Views and Indexes for SQL Databases", Retrieved May 26, 2011 at <<http://www.cs.cmu.edu/~natassa/courses/15-823/current/papers/vldb00.pdf>>, In VLDB ( 2000), 10 Pages.

Zilio, et al., "DB2 Design Advisor: Integrated Automatic Physical Database Design", Retrieved May 26, 2011 at <<http://citeseerx.ist.psu.edu/viewdoc/download?doi=10.1.1.58.6421&rep=rep1&type=pdf>>, In VLDB ( 2004), 11 Pages.

Agrawal, et al., "Database Tuning Advisor for Microsoft SQL Server 2005", Retrieved May 26, 2011 at <<http://citeseerx.ist.psu.edu/viewdoc/download?doi=10.1.1.153.3796&rep=rep1&type=pdf>>, In VLDB ( 2004), 12 Pages.

"Creating Compressed Tables and Indexes", Retrieved May 26, 2011 at <<http://msdn.microsoft.com/en-us/library/cc280449.aspx>>, Microsoft, 6 Pages.

Acharya, et al., "Join Synopses for Approximate Query Answering", Retrieved May 26, 2011 at <<http://www.mathcs.emory.edu/~cheung/Courses/584-StreamDB/Syllabus/papers/1999-Join-synopses-for-appr-query.pdf>>, In SIGMOD ( 1999), 12 Pages.

Chaudhuri, et al., "Index Merging", Retrieved May 26, 2011 at <<http://ieeexplore.ieee.org/stamp/stamp.jsp?arnumber=00754945>>, in ICDE ( 1999), 8 Pages.

Abadi, et al., "Integrating Compression and Execution in Column-oriented Database Systems", Retrieved May 26, 2011 at <<http://db.csail.mit.edu/projects/cstore/abadisigmod06.pdf>>, In SIGMOD ( 2006), 12 Pages.

Charikar, et al., "Towards Estimation Error Guarantees for Distinct Values", Retrieved May 26, 2011 at <<http://ftp.cse.buffalo.edu/users/azhang/disc/disc01/cd1/out/papers/pods/towardsestimatimosur.pdf>>, In PODS ( 2000), pp. 268-279.

Goodman, Leo A., "The Variance of the Product of K Random Variables", Journal of the American Statistical Association, vol. 57, No. 297, Mar. 1962, pp. 54-60.

\* cited by examiner

300b (3A)

↓

Determining the estimate size includes initializing a plurality of the index nodes representing the target group of the plurality of database indexes with a state value indicating an initial state, updating a first one of the index nodes with a state value indicating a deduced state, when a first candidate design strategy includes a task associated with estimating a size of the index associated with the first one of the index nodes based on size deduction, and updating a second one of the index nodes with a state value indicating a sampled state, when a second candidate design strategy includes a task associated with estimating a size of the index associated with the first one of the index nodes based on database table sampling. — 310

(3B)

↓

Determining the estimate size includes updating a first one of the deduction nodes with a state value indicating an enabled state, when the one or more children nodes associated with the first one of the deduction node are associated with one or more of a sampled state or a deduced state — 312

FIG. 3b

COMPRESSION AWARE PHYSICAL DATABASE DESIGN

BACKGROUND

In the rapidly expanding Information Age, relational database systems (RDBMSs) have been implemented to handle many large-scale applications. As the databases grow larger and larger, processing efficiency may erode. Many systems support lossless compression methods such as null suppression and dictionary encoding on physical design structures such as clustered and non-clustered indexes. Depending on the compression method and the distribution of values in the index, a compressed index may utilize only a small fraction of the storage space otherwise occupied by an uncompressed index. For decision support queries which frequently scan large indexes, compression may provide reduced input/output (I/O) overhead. However, while some compression strategies may improve system performance, others may hamper the performance.

SUMMARY

According to one general aspect, a design manager may include a request receiving engine configured to receive a request for an estimate size of a first compressed index associated with a first database index that is based on a database table. The design manager may also include a base index engine configured to obtain a plurality of values indicating sizes of a plurality of second compressed indexes associated with a plurality of respective second database indexes other than the first database index, the second database indexes based on the database table. The design manager may also include a size estimate engine configured to determine the estimate size of the first compressed database index based on one or more of the plurality of values.

According to another aspect, a plurality of indicators representing a plurality of respective database indexes associated with a database table may be obtained. An estimate size for a target group of the plurality of database indexes may be determined, based on a directed graph that includes a plurality of index nodes that represent size estimations associated with a portion of the respective database indexes, and a plurality of deduction nodes that include candidate deductions that are associated with one or more of the index nodes that are arranged as parent nodes relative to the deduction nodes in the directed graph, the plurality of deduction nodes associated with one or more of the index nodes arranged as children nodes relative to the deduction nodes, each of the children nodes indicating a candidate deduction compression associated with the each of the children nodes.

According to another aspect, a computer program product tangibly embodied on a computer-readable storage medium may include executable code that, when executed, may cause at least one data processing apparatus to obtain a plurality of indicators representing a plurality of respective candidate database configurations, each of the candidate database configurations including a plurality of database queries and a plurality of candidate database indexes associated with a database table. Further, the at least one data processing apparatus may select a portion of the candidate database indexes included in the plurality of database indexes based on skyline selection. Further, the at least one data processing apparatus may determine an enumeration of the portion of the plurality of the candidate database indexes based on a greedy algorithm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 3a-3b are a flowchart illustrating example operations of the system of FIG. 1.

DETAILED DESCRIPTION

Figure 1:
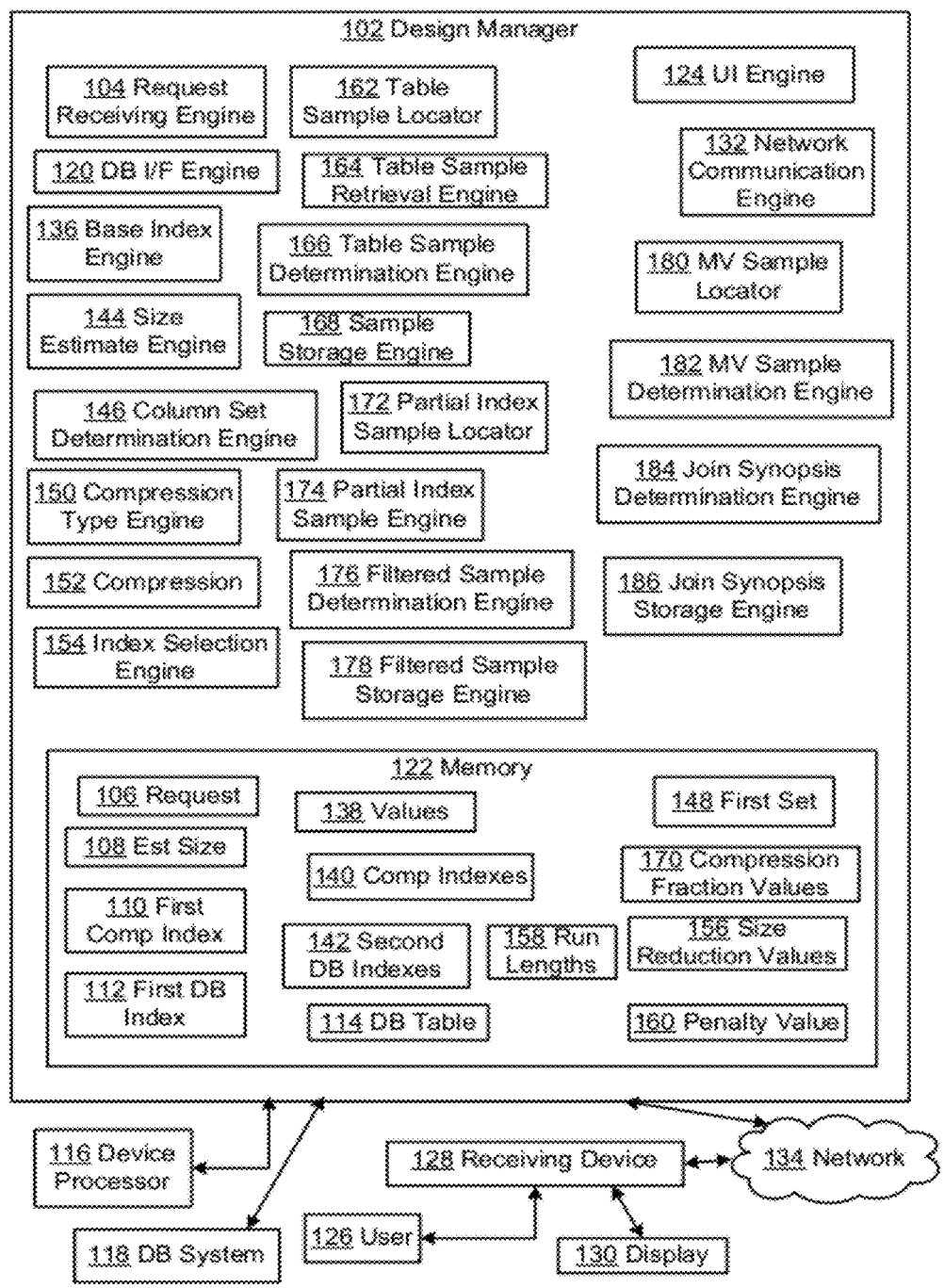
FIG. 1 is a block diagram of an example system for database design.

Relational database systems (RDBMSs) may support data compression using techniques such as null suppression and dictionary encoding. Data compression may reduce storage overhead, and may thus improve input/output (I/O) performance for decision support queries. However, compression may also slow down query and update performance due to the CPU costs of compression and decompression.

Example techniques discussed herein may provide a design-time analysis of effects of data compression with regard to choices of elements of physical database design, such as indexes, for a given workload. For example, example techniques that decouple the decision of whether or not to choose an index from whether or not to compress the index may provide suboptimal designs.

Thus, according to an example embodiment, example techniques discussed herein may integrate compression into physical database design in a scalable manner. For example, example techniques discussed herein may be implemented based on modifications to MICROSOFT SQL SERVER and the DATABASE ENGINE TUNING ADVISOR (DTA) physical design tool. However, example techniques discussed herein may also be used with DBMSs that support other compression methods.

Example techniques discussed herein may provide design strategies for generating system designs that may improve system performance. For example, techniques are discussed for estimating the size of a compressed index that may scale to a large number of indexes. Further, example techniques are discussed for extending physical design tools to provide incorporation of compressed physical design structures.

According to an example embodiment, example techniques discussed herein may provide estimation sizes of a large number of compressed indexes. According to an example embodiment, example techniques discussed herein may extend search algorithms used in physical design tools with regard to incorporating compressed physical design structures.

Relational database systems may support lossless compression methods such as null suppression and dictionary encoding on physical design structures such as clustered and non-clustered indexes. Depending on the compression technique and the distribution of values in the index, a compressed index may utilize a small fraction of the storage space of a corresponding uncompressed index.

In this context, a database "index" may refer to a data structure that may include a portion of the information stored in a database table. For example, an index may be created based on one or more database columns associated with the database table.

For decision support queries which frequently scan large indexes, compression may reduce input/output (I/O) costs. However, while compression may improve performance, it also may hamper performance. For example, processing a query may involve decompressing the data, which may incur additional CPU costs. This may hamper queries that are already CPU bound.

Further, updates (e.g., INSERT/UPDATE statements) may involve additional CPU costs since processing the updates may involve decompressing the data, updating and then compressing the updated data. Thus, compression may introduce additional overhead considerations to physical database design techniques.

Automated physical design tools may assist database administrators (DBAs) in making physical design choices. Such tools may accept as input a workload of a Structured Query Language (SQL) query, update statements and a storage bound, and may provide a configuration (e.g., a set of indexes) that may optimize workload performance, while not exceeding the given storage bound.

For example, a performance metric for optimization techniques may include an optimizer's estimated costs of statements in a workload. According to an example embodiment, example techniques discussed herein may further consider an impact of compression on physical database design.

As further discussed herein, compression may be incorporated into automated physical database design. As further discussed herein, the example designs may consider compression of indexes, and example techniques discussed herein may further extend to other physical design structures such as partial indexes and materialized views (which may also be compressed).

In design considerations, decoupling a decision of whether or not to choose an index from whether or not to compress the index may result in suboptimal solutions. Different indexes may achieve different compression fractions (i.e., ratios of compressed size to uncompressed size), and therefore the I/O reduction as well as the update cost of an index for a query/update relative to another index may change when compression is considered. For example, a strategy may include staging index selection and compression; i.e., select indexes without considering compression, compress the selected indexes, and repeat the technique if the space consumed is below the storage bound. As shown below, the staged approach may ignore otherwise beneficial solutions.

As a first example, a table may be indicated as
Sales (OrderID, Shipdate, State, Price, Discount, . . . )
and a query may be indicated as
Q=SELECT SUM(Price*Discount) FROM Sales
    WHERE Shipdate BETWEEN '01-01-2009' and '12-31-2009'
    AND State='CA'.
Two example indexes on Sales may be indicated as
$I_1$=(Shipdate, State) and $I_2$=(Shipdate, State, Price, Discount)
For this example, a storage bound is 100 GB and the sizes of indexes $I_1$, $I_2$ respectively are 95 GB, 170 GB. For this example, $CI_1$ and $CI_2$ are compressed versions of $I_1$ and $I_2$ respectively and the sizes of $CI_1$ and $CI_2$ respectively are 50 GB and 90 GB.

For this example, if indexes are selected without considering compression, then $I_1$ may be selected, as $I_2$ does not fit within the given space budget. Once $I_1$ is selected, there will not be enough storage to add $CI_2$ later.

However, if compression is considered during the index selection process, $CI_2$ may be selected, as the size of $CI_2$ is below the given storage bound. For this example, $CI_2$ is a covering index for Q (i.e., it includes all columns involved in answering Q) and may thus can improve the query's I/O performance.

Similarly, choosing an index without considering how its update cost will increase if the index is subsequently compressed may also result in suboptimal solutions due to high update cost.

In design techniques for integrating compression into physical design, several considerations may include the following. For example, a large number of new (compressed) indexes may be considered. In principle, for each index, compressed variants of that index may also be considered, one per compression method available in the RDBMS. For example, in MICROSOFT SQL SERVER both null suppression and dictionary encoding methods may be available for compressing an index. For each compressed index, an accurate and efficient estimate of the size (i.e., number of pages) of each index may be beneficial, as this information may be provided to the query optimizer in determining the cost of the execution plan that uses the index.

As discussed further below, for an uncompressed index, the size may be estimated once the number of rows and average row length are known. However, for a compressed index, the size may depend on the compression method and the value distribution of columns in the index. For example, an index that is dictionary compressed may have a significantly different size than if compressed using null suppression.

As discussed further below, sampling may aid in decreasing CPU time for estimation of compressed indexes (i.e., a sample may be obtained and the index may be generated on the sample). As discussed further below, a compression fraction thus obtained may be used to infer the size of the full compressed index.

As discussed further below, compression may amplify a space vs. time trade-off involved in physical design tools. For example, for scalability reasons, physical design tools may be designed to perform early pruning by eliminating indexes that are not part of an "optimal" configuration for at least one query in the workload. Such pruning may be based on query costs. Thus, a compressed index that may reduce storage space while increasing query costs a little may likely be pruned. However, retaining such indexes may improve the overall quality of solutions noticeably since the reduced storage allows other indexes to be added (potentially benefiting many other queries).

As discussed further below, physical design tools may rely on extensions to the query optimizer application programming interface (API) to support "what-if" analysis. For example, given a configuration and a query, the API may return the optimizer's estimated cost of the query under the configuration. Integrating compression into physical design may involve extending the query optimizer's cost model to reflect the cost of using a compressed index. As discussed further below, example cost models may be extended to make them "compression-aware." For example, cost models may capture CPU costs of compression and decompression as well as I/O cost reduction due to compression. For example, example techniques discussed herein may be integrated into automated physical database design tools so that they may recommend a combination of compressed and uncompressed indexes.

As further discussed herein, FIG. 1 is a block diagram of a system 100 for database design. As shown in FIG. 1, a system 100 may include a design manager 102 that includes a request receiving engine 104 that may be configured to receive a request 106 for an estimate size 108 of a first compressed index 110 associated with a first database index 112 that is based on a database table 114.

According to an example embodiment, the design manager 102 may be embodied via executable instructions that may be stored on a computer-readable storage medium, as discussed below. According to an example embodiment, the computer-readable storage medium may include any number of storage devices, and any number of storage media types, including distributed devices. According to an example embodiment, one or more of the executable instructions may be executed via one or more device processors 116.

In this context, a "processor" may include a single processor or multiple processors configured to process instructions associated with a processing system. A processor may thus include multiple processors processing instructions in parallel and/or in a distributed manner. Although the device processor 116 is depicted as external to the design manager 102 in FIG. 1, one skilled in the art of data processing will appreciate that the device processor 116 may be implemented as a single component, and/or as distributed units which may be located internally or externally to the design manager 102, and/or any of its elements.

For example, a database 118 may include the first database index 112 and the database table 114, and may be accessed via a database interface engine 120. One skilled in the art of data processing will appreciate that there are many techniques for storing database information discussed herein, such as various types of database configurations (e.g., SQL SERVERS) and non-database configurations.

According to an example embodiment, the design manager 102 may include a memory 122 that may store the request 106 and other data for processing by the design manager 102. In this context, a "memory" may include a single memory device or multiple memory devices configured to store data and/or instructions. Further, the memory 122 may span multiple distributed storage devices.

According to an example embodiment, a user interface engine 124 may be configured to manage communications between a user 126 and the design manager 102. The user 126 may be associated with a receiving device 128 that may be associated with a display 130 and other input/output devices. For example, the display 130 may be configured to communicate with the receiving device 128, via internal device bus communications, or via at least one network connection.

According to an example embodiment, the design manager 102 may include a network communication engine 132 that may manage network communication between the design manager 102 and other entities that may communicate with the design manager 102 via at least one network 134. For example, the at least one network 134 may include at least one of the Internet, at least one wireless network, or at least one wired network. For example, the at least one network 134 may include a cellular network, a radio network, or any type of network that may support transmission of data for the design manager 102. For example, the network communication engine 132 may manage network communications between the design manager 102 and the receiving device 128. For example, the network communication engine 132 may manage network communication between the user interface engine 124 and the receiving device 128.

A base index engine 136 may be configured to obtain a plurality of values 138 indicating sizes of a plurality of second compressed indexes 140 associated with a plurality of respective second database indexes 142 other than the first database index 112, the second database indexes 142 based on the database table 114.

A size estimate engine 144 may be configured to determine the estimate size 108 of the first compressed database index 110 based on one or more of the plurality of values 138.

According to an example embodiment, the database table 114 may be included in a relational database system.

According to an example embodiment, a column set determination engine 146 may be configured to determine a first set 148 of table columns associated with the database table 114, wherein the first database index 112 is based on the first set 148 of table columns.

According to an example embodiment, a compression type engine 150 may be configured to determine that a compression 152 associated with the requested estimate size 108 associated with the first compressed index 110 generates compressed indexes that share a common compressed size independent of an ordering of tuples associated with database table columns, as discussed further below.

According to an example embodiment, an index selection engine 154 may be configured to select one of the second database indexes 142 that is, in common with the first database index 112, based on the first set 148 of table columns.

According to an example embodiment, the size estimate engine 144 may be configured to determine the estimate size 108 of the first compressed database index 110 based on deducing the estimate size 108 of the first compressed database index 110 based on the value indicating the size of the compressed index associated with the selected one of the second database indexes 142, as discussed further below.

According to an example embodiment, the compression 152 associated with the requested estimate size 108 may include one or more of null suppression or global dictionary compression.

According to an example embodiment, the column set determination engine 146 may be configured to determine a first set 148 of table columns associated with the database table 114, wherein the first database index 112 may be based on the first set 148 of table columns.

According to an example embodiment, a compression type engine 150 may be configured to determine that a compression 152 associated with the requested estimate size 108 associated with the first compressed index 110 generates compressed indexes that share a common compressed size independent of an ordering of tuples associated with database table columns.

According to an example embodiment, an index selection engine 154 may be configured to select one or more of the second database indexes 142 that are based on one or more of the table columns included in one or more subsets of the first set 148 of table columns.

According to an example embodiment, the size estimate engine 144 may be configured to determine the estimate size 108 of the first compressed database index 110 based on extrapolating the estimate size 108 of the first compressed database index 110 based on determining one or more size reduction values 156 for each selected second database index 142, based on determining differences between the value indicating the size of the compressed index associated with the selected one of the second database indexes 142 and a value indicating the size of the selected one of the second database indexes 142, as discussed further below.

According to an example embodiment, a column set determination engine 146 may be configured to determine a first set 148 of table columns associated with the database table 114, wherein the first database index 112 is based on the first set 148 of table columns.

According to an example embodiment, an index selection engine 154 may be configured to select one or more of the second database indexes 142 that are based on one or more of the table columns included in one or more subsets of the first set 148 of table columns.

According to an example embodiment, the size estimate engine 144 may be configured to determine the estimate size 108 of the first compressed database index 110 based on extrapolating the estimate size 108 of the first compressed database index 110 based on an order-dependent column extrapolation, based on determining one or more run lengths 158 of values stored in one or more columns of the selected one or more of the second database indexes 142, and determining at least one penalty value 160 associated with a size reduction that is associated with one or more columns of the selected one or more of the second database indexes 142, as discussed further below.

According to an example embodiment, a compression 152 associated with the requested estimate size 108 may include one or more of page-local dictionary encoding or run length encoding, as discussed further below.

According to an example embodiment, a table sample locator 162 may be configured to determine whether a database table sample associated with the database table 114 is stored in a table sample storage device.

According to an example embodiment, a table sample retrieval engine 164 may be configured to obtain the database table sample, based on a first result of the determination of whether a database table sample associated with the database table 114 is stored in a table sample storage device.

According to an example embodiment, a table sample determination engine 166 may be configured to obtain a random sample from the database table, based on a second result of the determination of whether a database table sample associated with the database table 114 is stored in a table sample storage device, the random sample including a subset of rows included in the database table 114.

According to an example embodiment, a sample storage engine 168 may be configured to initiate storage of the random sample obtained by the table sample determination engine 166, as the database table sample in the table sample storage device.

According to an example embodiment, the base index engine 136 may be configured to obtain the plurality of values 138 based on one or more compression fraction values 170 associated with the obtained database table sample, as discussed further below.

According to an example embodiment, a partial index sample locator 172 may be configured to determine whether a partial index table sample associated with a database partial index associated with the database table 114 is stored in a table sample storage device.

According to an example embodiment, a partial index sample engine 174 may be configured to obtain the partial index table sample, based on a first result of the determination of whether the partial index table sample is stored in the table sample storage device, as discussed further below.

According to an example embodiment, a filtered sample determination engine 176 may be configured to obtain a filtered sample from the database table sample, based on a second result of the determination of whether the partial index table sample is stored in the table sample storage device, as discussed further below.

According to an example embodiment, a filtered sample storage engine 178 may be configured to initiate storage of the filtered sample obtained by the filtered sample determination engine 176, as the partial index table sample in the table sample storage device.

According to an example embodiment, a materialized view sample locator 180 may be configured to determine whether a materialized view sample associated with a materialized view associated with the database table 114 is stored in a table sample storage device.

According to an example embodiment, a materialized view sample determination engine 182 may be configured to obtain the materialized view sample, based on a first result of the determination of whether the materialized view table sample is stored in the table sample storage device.

According to an example embodiment, a join synopsis determination 184 engine may be configured to obtain a plurality of join synopses of a database associated with the database table 114, based on a second result of the determination of whether the partial index table sample is stored in the table sample storage device, as discussed further below.

According to an example embodiment, a join synopsis storage engine 186 may be configured to initiate storage of the plurality of join synopses obtained by the join synopsis determination engine 184, as the partial index table sample in the table sample storage device.

Figure 2A:
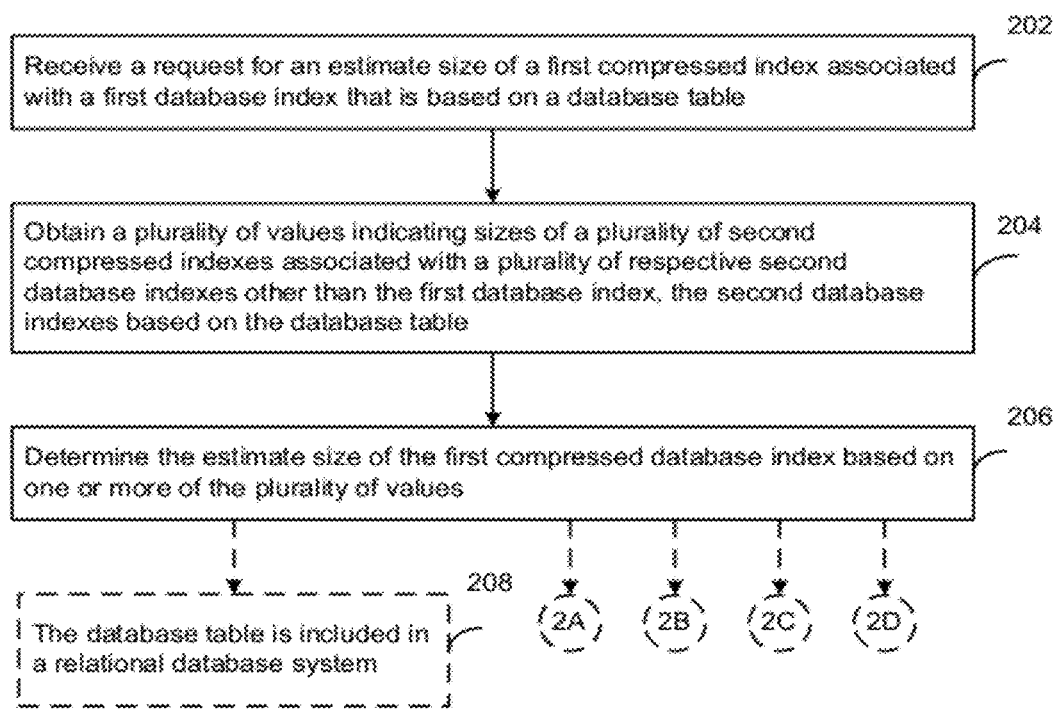
FIGS. 2a-2g are a flowchart illustrating example operations of the system of FIG. 1.
Figure 2B:
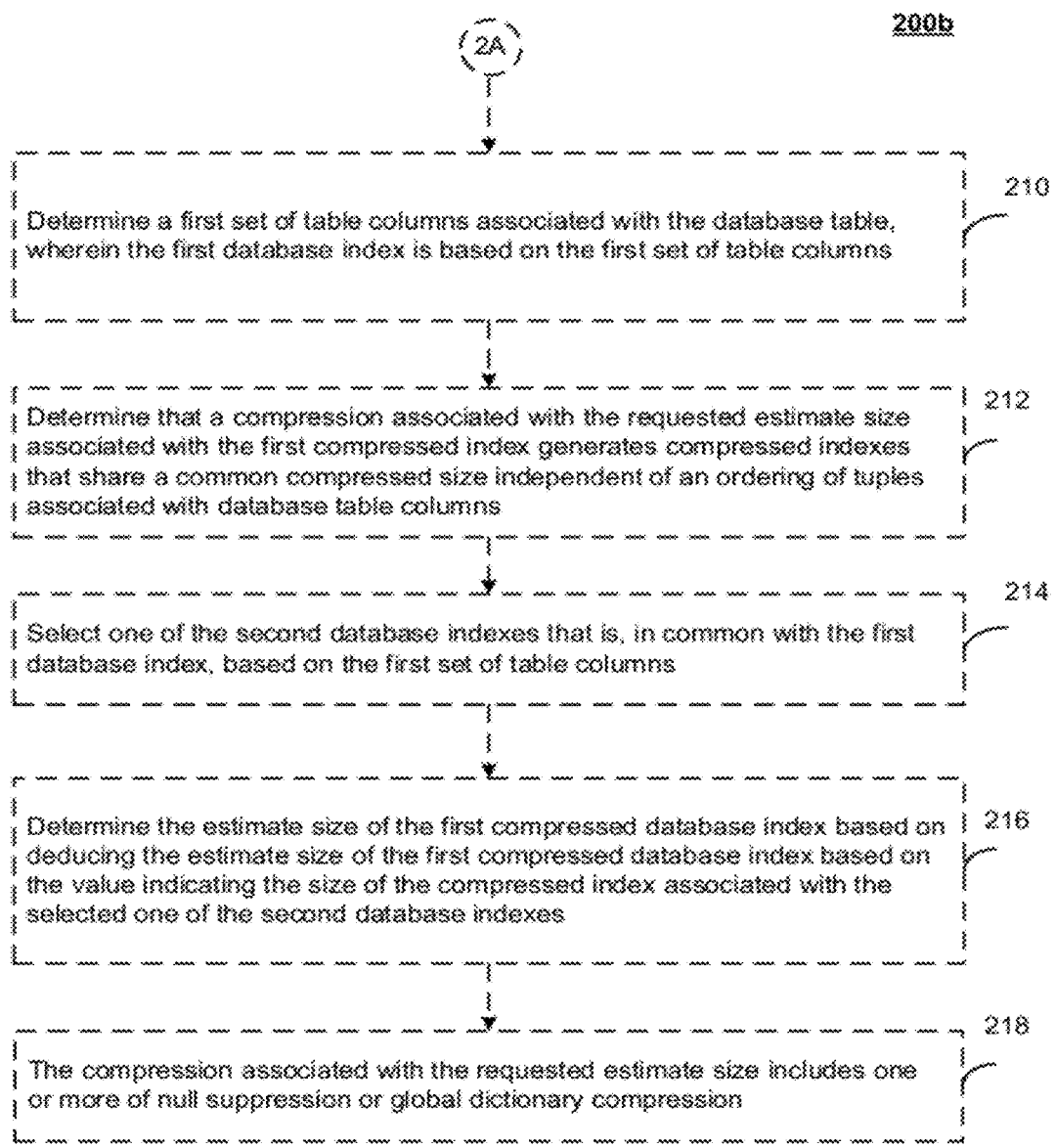
Figure 2C:
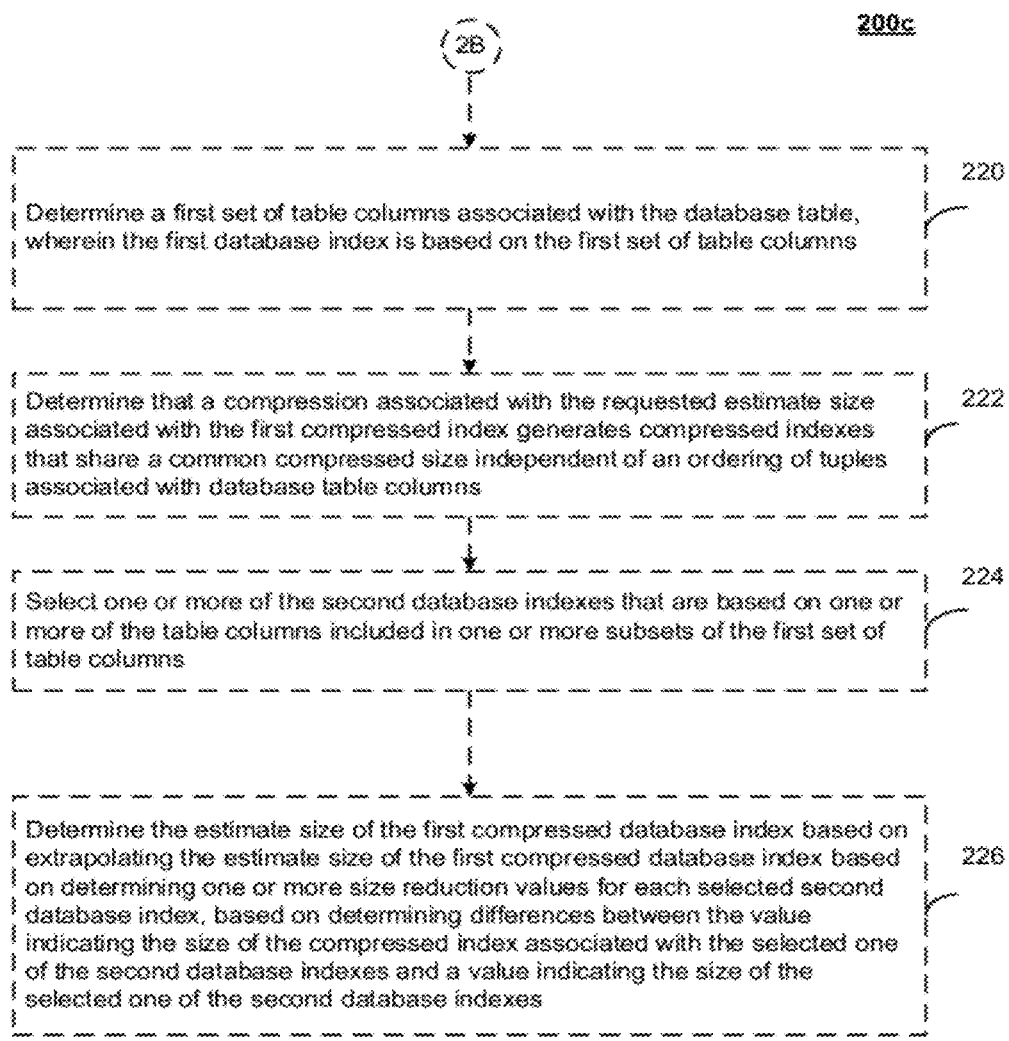
Figure 2D:
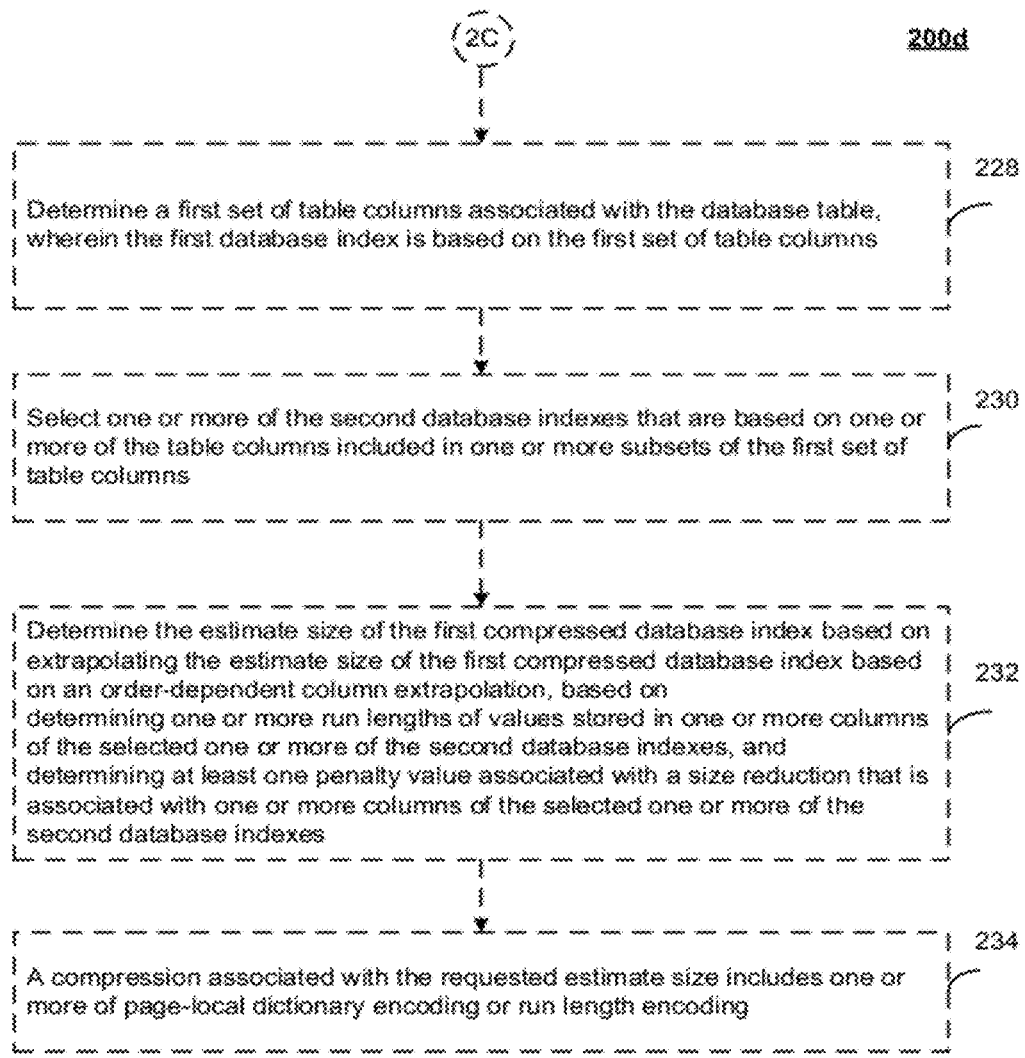
Figure 2E:
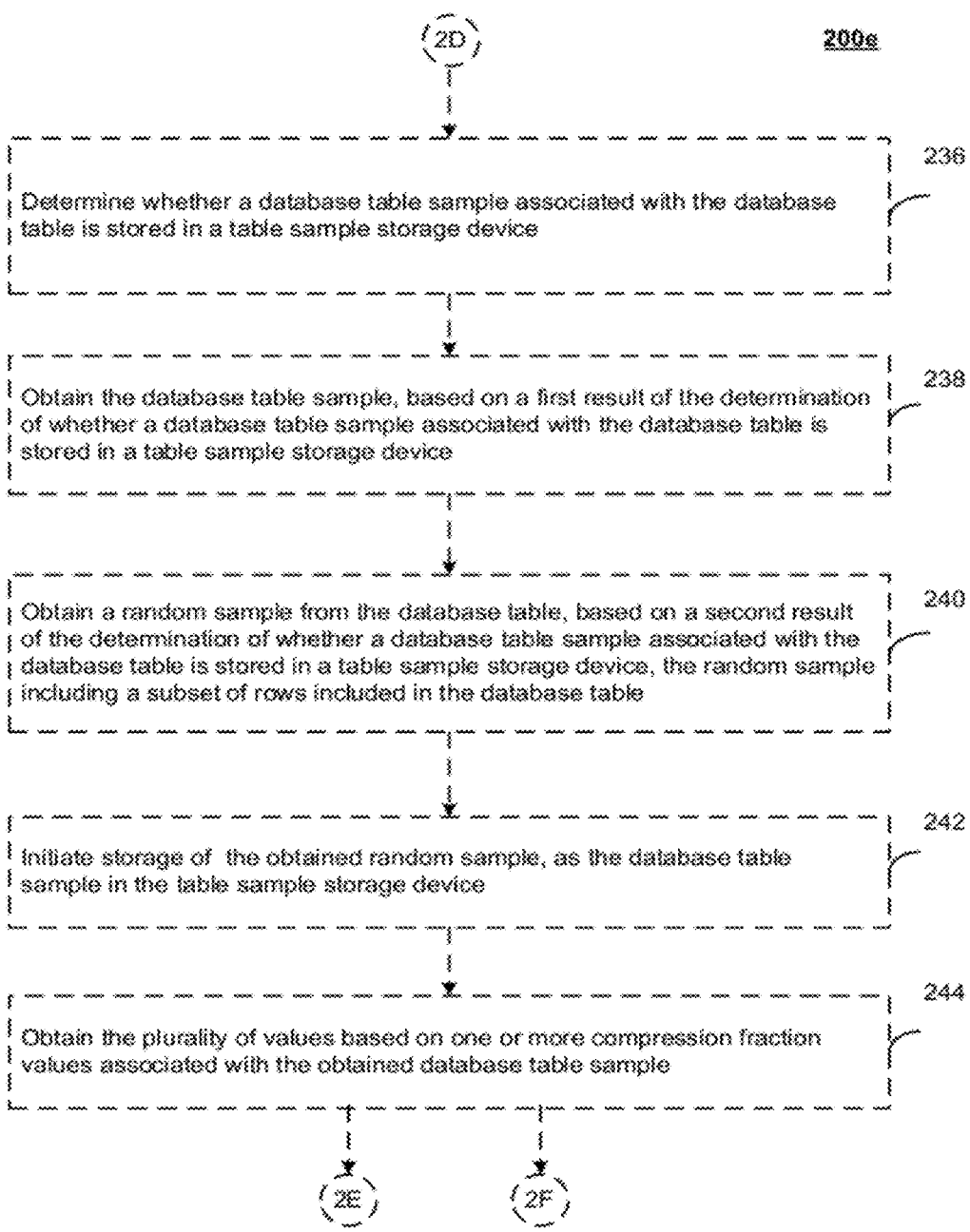
Figure 2F:
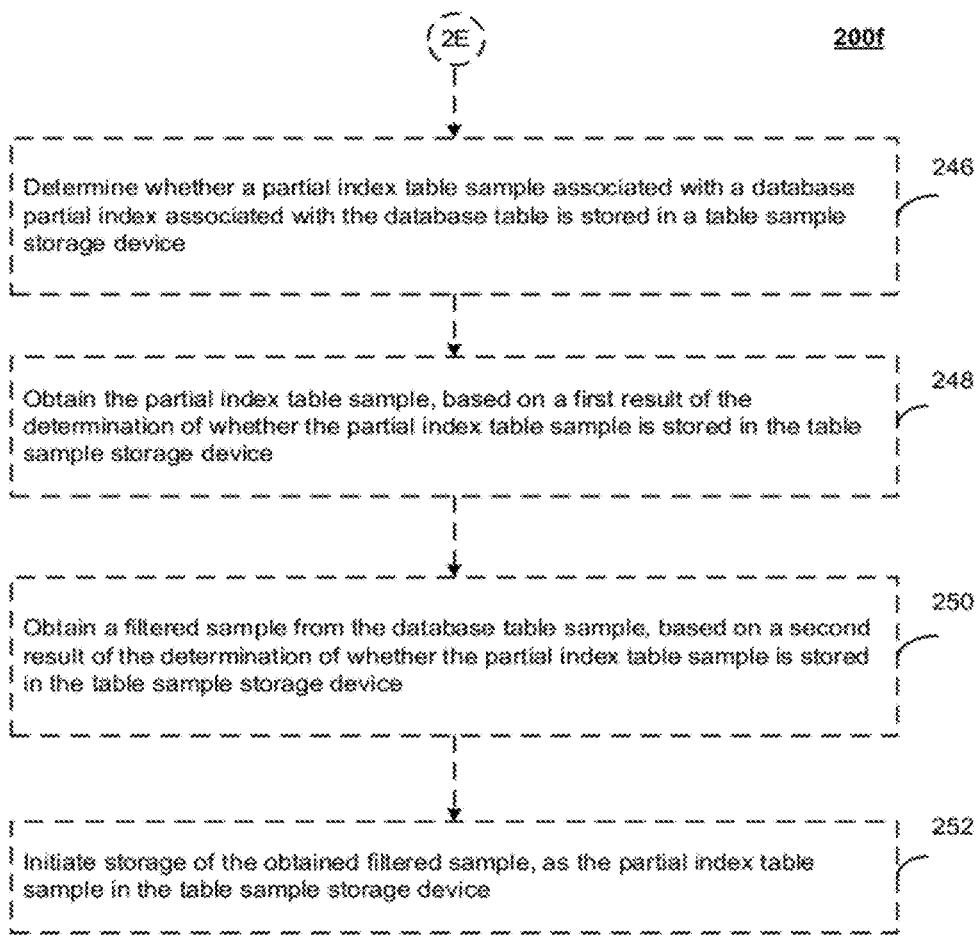
Figure 2G:
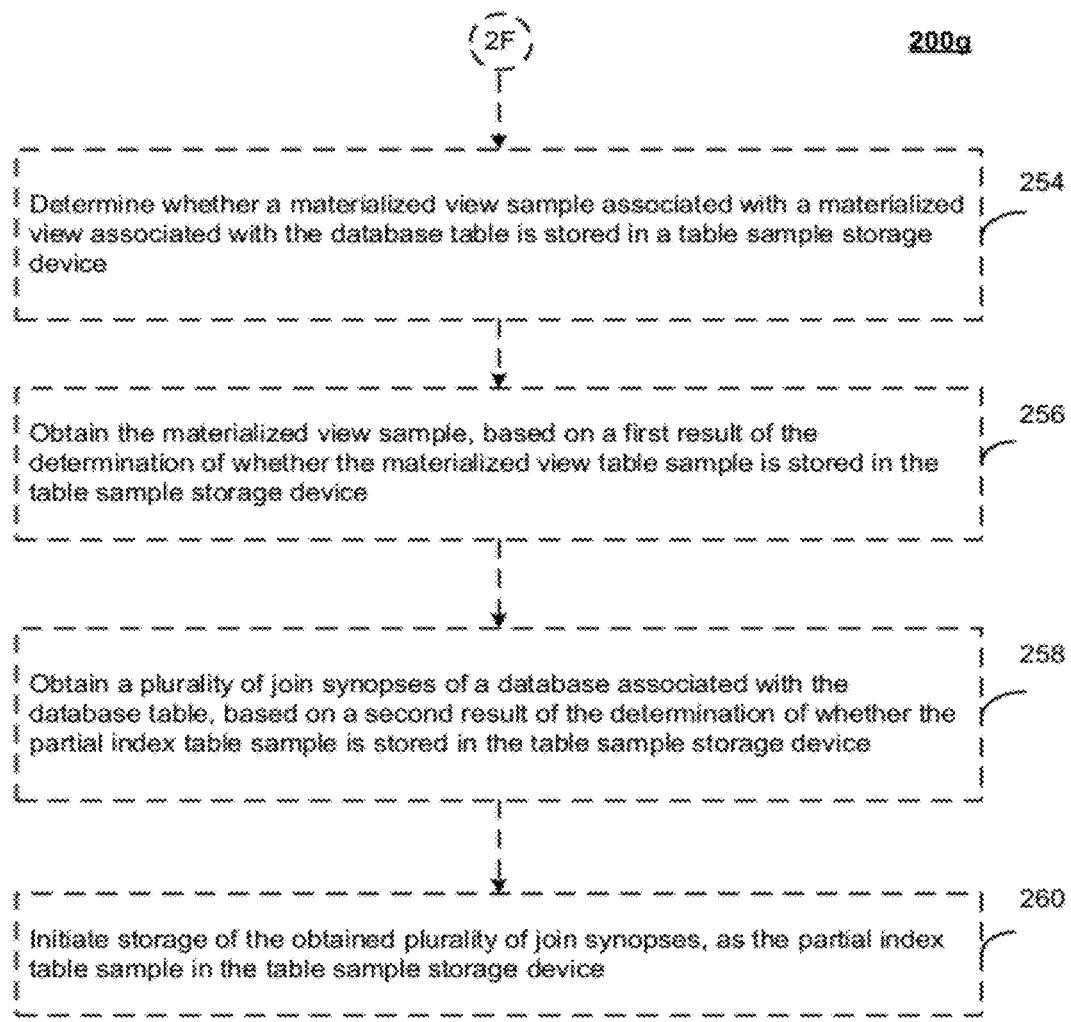

FIGS. 2a-2g are a flowchart illustrating example operations of the system of FIG. 1, according to example embodiments. In the example of FIG. 2a, a request for an estimate size of a first compressed index associated with a first database index that is based on a database table may be received (202). For example, the request receiving engine 104 may receive the request for an estimate size of a first compressed index associated with a first database index that is based on a database table, as discussed above.

A plurality of values indicating sizes of a plurality of second compressed indexes associated with a plurality of respective second database indexes other than the first database index may be obtained, the second database indexes based on the database table (204). For example, the base index engine 136 may obtain a plurality of values indicating sizes of a plurality of second compressed indexes associated with a plurality of respective second database indexes other than the first database index, the second database indexes based on the database table, as discussed above.

The estimate size of the first compressed database index may be determined based on one or more of the plurality of values (206). For example, the size estimate engine 144 may determine the estimate size of the first compressed database index based on one or more of the plurality of values, as discussed above.

According to an example embodiment, the database table may be included in a relational database system (208).

According to an example embodiment, a first set of table columns associated with the database table may be determined, wherein the first database index is based on the first set of table columns (210). For example, the column set determination engine 146 may determine a first set of table columns associated with the database table, wherein the first database index is based on the first set of table columns;

According to an example embodiment, it may be determined that a compression associated with the requested estimate size associated with the first compressed index generates compressed indexes that share a common compressed size independent of an ordering of tuples associated with database table columns (212). a compression type engine configured to determine that a compression associated with the requested estimate size associated with the first compressed index generates compressed indexes that share a common compressed size independent of an ordering of tuples associated with database table columns;

According to an example embodiment, one of the second database indexes that is, in common with the first database index, based on the first set of table columns may be selected (214). For example, the index selection engine 154 may select one of the second database indexes that is, in common with the first database index, based on the first set of table columns, as discussed above.

According to an example embodiment, the estimate size of the first compressed database index may be determined based on deducing the estimate size of the first compressed database index based on the value indicating the size of the compressed index associated with the selected one of the second database indexes (216). For example, the size estimate engine 144 may determine the estimate size of the first compressed database index based on deducing the estimate size of the first compressed database index based on the value indicating the size of the compressed index associated with the selected one of the second database indexes, as discussed above.

According to an example embodiment, the compression associated with the requested estimate size includes one or more of null suppression or global dictionary compression (218).

According to an example embodiment, a first set of table columns associated with the database table may be determined, wherein the first database index is based on the first set of table columns (220). For example, the column set determination engine 146 may determine a first set of table columns associated with the database table, wherein the first database index is based on the first set of table columns, as discussed above.

According to an example embodiment, it may be determined that a compression associated with the requested estimate size associated with the first compressed index generates compressed indexes that share a common compressed size independent of an ordering of tuples associated with database table columns (222). For example, the compression type engine 150 may determine that a compression associated with the requested estimate size associated with the first compressed index generates compressed indexes that share a common compressed size independent of an ordering of tuples associated with database table columns, as discussed above.

According to an example embodiment, one or more of the second database indexes that are based on one or more of the table columns included in one or more subsets of the first set of table columns may be selected (224). For example, the index selection engine 154 may select one or more of the second database indexes that are based on one or more of the table columns included in one or more subsets of the first set of table columns, as discussed above.

According to an example embodiment, the estimate size of the first compressed database index may be determined based on extrapolating the estimate size of the first compressed database index based on determining one or more size reduction values for each selected second database index, based on determining differences between the value indicating the size of the compressed index associated with the selected one of the second database indexes and a value indicating the size of the selected one of the second database indexes (226). For example, the size estimate engine 144 may determine the estimate size of the first compressed database index based on extrapolating the estimate size of the first compressed database index based on determining one or more size reduction values for each selected second database index, based on determining differences between the value indicating the size of the compressed index associated with the selected one of the second database indexes and a value indicating the size of the selected one of the second database indexes, as discussed above.

According to an example embodiment, a first set of table columns associated with the database table may be determined, wherein the first database index is based on the first set of table columns (228). For example, the column set determination engine 146 may determine a first set of table columns associated with the database table, wherein the first database index is based on the first set of table columns, as discussed above.

According to an example embodiment, one or more of the second database indexes that are based on one or more of the table columns included in one or more subsets of the first set of table columns may be selected (230). For example, the index selection engine 154 may select one or more of the second database indexes that are based on one or more of the table columns included in one or more subsets of the first set of table columns, as discussed above.

According to an example embodiment, the estimate size of the first compressed database index may be determined based on extrapolating the estimate size of the first compressed database index based on an order-dependent column extrapolation, based on determining one or more run lengths of values stored in one or more columns of the selected one or more of the second database indexes, and determining at least one penalty value associated with a size reduction that is associated with one or more columns of the selected one or more of the second database indexes (232). For example, the size estimate engine 144 may determine the estimate size of the first compressed database index based on extrapolating the estimate size of the first compressed database index based on an order-dependent column extrapolation, as discussed above.

According to an example embodiment, a compression associated with the requested estimate size may include one or more of page-local dictionary encoding or run length encoding (234).

According to an example embodiment, it may be determined whether a database table sample associated with the database table is stored in a table sample storage device (236). For example, the table sample locator 162 may determine whether a database table sample associated with the database table is stored in a table sample storage device, as discussed above.

According to an example embodiment, the database table sample may be obtained, based on a first result of the determination of whether a database table sample associated with the database table is stored in a table sample storage device (238). For example, the table sample retrieval engine 164 may obtain the database table sample, based on a first result of the determination of whether a database table sample associated with the database table is stored in a table sample storage device, as discussed above.

According to an example embodiment, a random sample from the database table may be obtained, based on a second result of the determination of whether a database table sample associated with the database table is stored in a table sample storage device, the random sample including a subset of rows included in the database table (240). For example, the table sample determination engine 166 may obtain a random sample from the database table, based on a second result of the determination of whether a database table sample associated with the database table is stored in a table sample storage device, the random sample including a subset of rows included in the database table, as discussed above.

According to an example embodiment, storage of the random sample obtained by the table sample determination engine, as the database table sample in the table sample storage device, may be initiated (242). For example, the sample storage engine 168 may initiate storage of the random sample obtained by the table sample determination engine, as the database table sample in the table sample storage device, as discussed above.

According to an example embodiment, the plurality of values may be obtained based on one or more compression fraction values associated with the obtained database table sample (244). For example, the base index engine 136 may obtain the plurality of values based on one or more compression fraction values associated with the obtained database table sample, as discussed above.

According to an example embodiment, it may be determined whether a partial index table sample associated with a database partial index associated with the database table is stored in a table sample storage device (246). For example, the partial index sample locator 172 may determine whether a partial index table sample associated with a database partial index associated with the database table is stored in a table sample storage device, as discussed above.

According to an example embodiment, the partial index table sample may be obtained, based on a first result of the determination of whether the partial index table sample is stored in the table sample storage device (248). For example, the partial index sample engine 174 may obtain the partial index table sample, based on a first result of the determination of whether the partial index table sample is stored in the table sample storage device, as discussed above.

According to an example embodiment, a filtered sample may be obtained from the database table sample, based on a second result of the determination of whether the partial index table sample is stored in the table sample storage device (250). For example, the filtered sample determination engine 176 may obtain a filtered sample from the database table sample, based on a second result of the determination of whether the partial index table sample is stored in the table sample storage device, as discussed above.

According to an example embodiment, storage of the filtered sample obtained by the filtered sample determination engine, as the partial index table sample in the table sample storage device, may be initiated (252). For example, the filtered sample storage engine 178 may initiate storage of the obtained filtered sample, as the partial index table sample in the table sample storage device, as discussed above.

According to an example embodiment, it may be determined whether a materialized view sample associated with a materialized view associated with the database table is stored in a table sample storage device (256). For example, the materialized view sample locator 180 may determine whether a materialized view sample associated with a materialized view associated with the database table is stored in a table sample storage device, as discussed above.

According to an example embodiment, the materialized view sample may be obtained, based on a first result of the determination of whether the materialized view table sample is stored in the table sample storage device (256). For example, the materialized view sample determination engine 182 may obtain the materialized view sample, based on a first result of the determination of whether the materialized view table sample is stored in the table sample storage device, as discussed above.

According to an example embodiment, a plurality of join synopses of a database associated with the database table may be obtained, based on a second result of the determination of whether the partial index table sample is stored in the table sample storage device (258). For example, the join synopsis determination engine 184 may obtain a plurality of join synopses of a database associated with the database table, based on a second result of the determination of whether the partial index table sample is stored in the table sample storage device, as discussed above.

In this context, "join synopses" may refer to precomputed samples of a small set of distinguished joins, in reference to relational databases. For example, the join synopses may be used for determining approximate join aggregates According to an example embodiment, storage of the obtained plurality of join synopses, as the partial index table sample in the table sample storage device, may be initiated (260). For example, the join synopsis storage engine 186 may initiate storage of the plurality of join synopses, as discussed above.

Figure 3A:
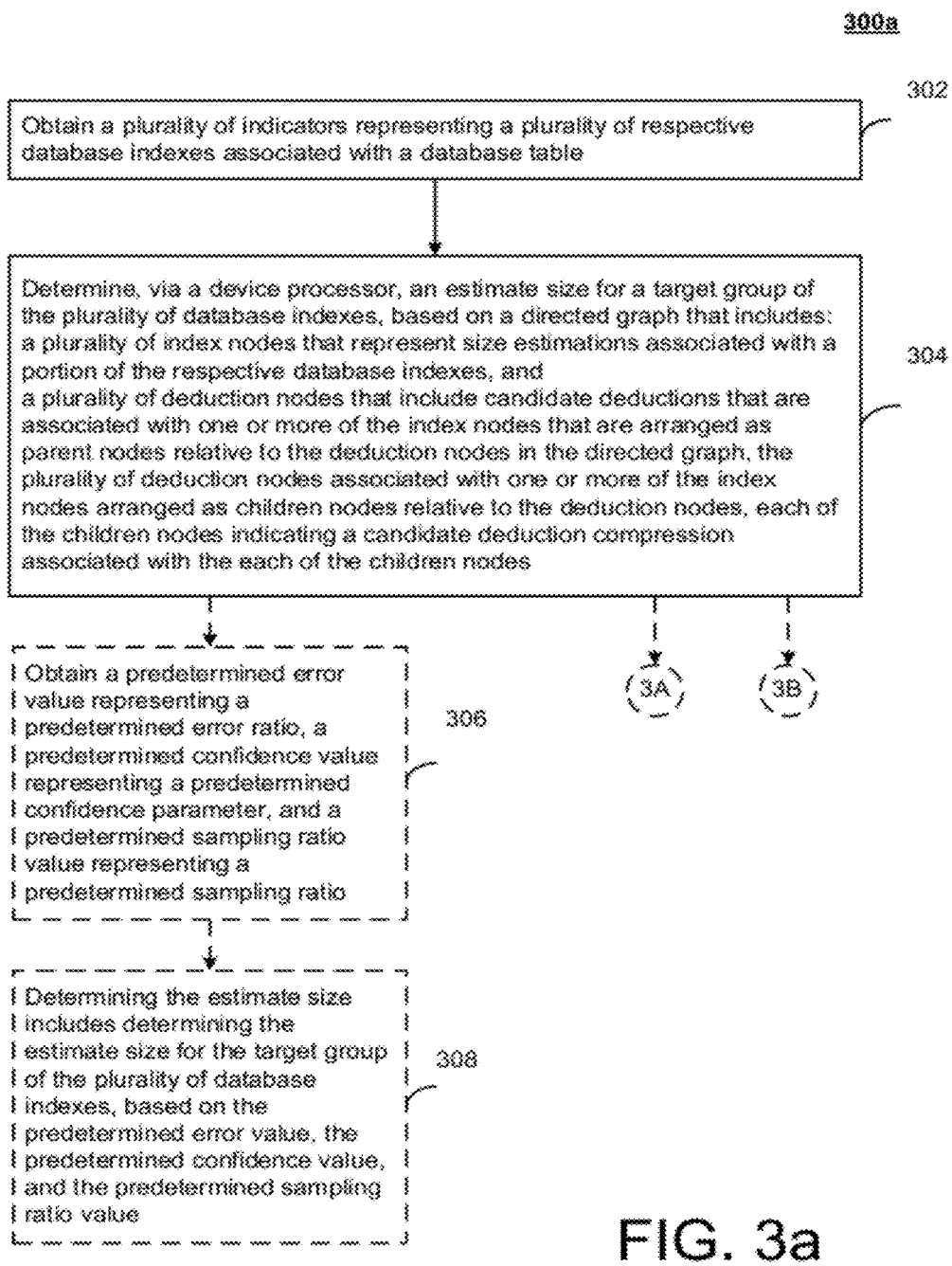

FIGS. 3*a*-3*b* are a flowchart illustrating example operations of the system of FIG. 1, according to example embodiments. In the example of FIG. 3*a*, a plurality of indicators representing a plurality of respective database indexes associated with a database table may be obtained (302), as discussed further below.

An estimate size for a target group of the plurality of database indexes may be determined, via a device processor, based on a directed graph that includes a plurality of index nodes that represent size estimations associated with a portion of the respective database indexes, and a plurality of deduction nodes that include candidate deductions that are associated with one or more of the index nodes that are arranged as parent nodes relative to the deduction nodes in the directed graph, the plurality of deduction nodes associated with one or more of the index nodes arranged as children nodes relative to the deduction nodes, each of the children nodes indicating a candidate deduction compression associated with the each of the children nodes (304). The directed graph is discussed further below.

According to an example embodiment, a predetermined error value representing a predetermined error ratio, a predetermined confidence value representing a predetermined confidence parameter, and a predetermined sampling ratio value representing a predetermined sampling ratio may be obtained (306), as discussed further below.

According to an example embodiment, determining the estimate size may include determining the estimate size for the target group of the plurality of database indexes, based on the predetermined error value, the predetermined confidence value, and the predetermined sampling ratio value (308).

According to an example embodiment, determining the estimate size may include initializing a plurality of the index nodes representing the target group of the plurality of database indexes with a state value indicating an initial state, updating a first one of the index nodes with a state value indicating a deduced state, when a first candidate design strategy includes a task associated with estimating a size of the index associated with the first one of the index nodes based on size deduction, and updating a second one of the index nodes with a state value indicating a sampled state, when a second candidate design strategy includes a task associated with estimating a size of the index associated with the first one of the index nodes based on database table sampling (310).

According to an example embodiment, determining the estimate size may include updating a first one of the deduction nodes with a state value indicating an enabled state, when the one or more children nodes associated with the first one of the deduction node are associated with one or more of a sampled state or a deduced state (312), as discussed further below.

Figure 4A:
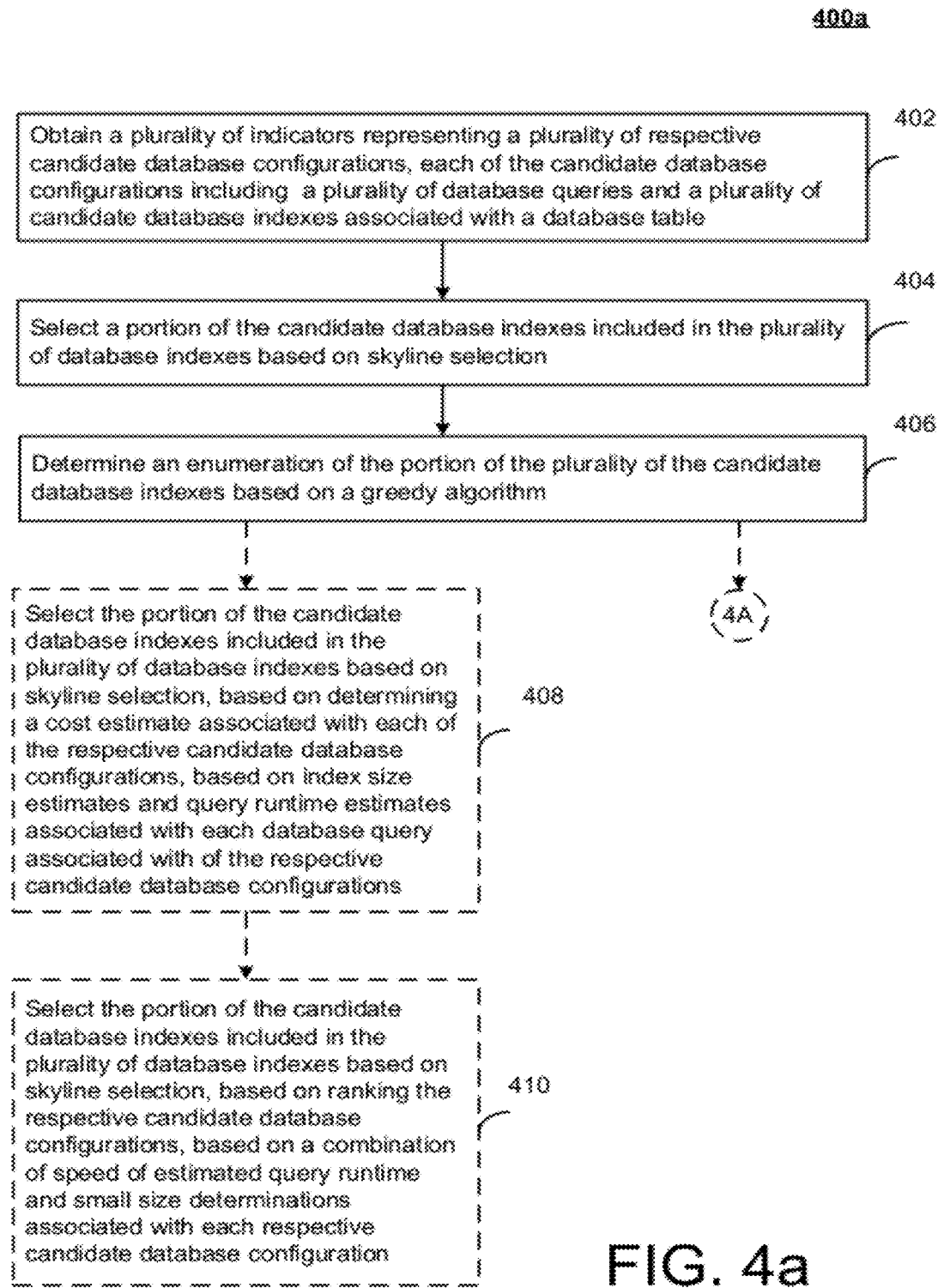
FIGS. 4a-4b are a flowchart illustrating example operations of the system of FIG. 1.
Figure 4B:
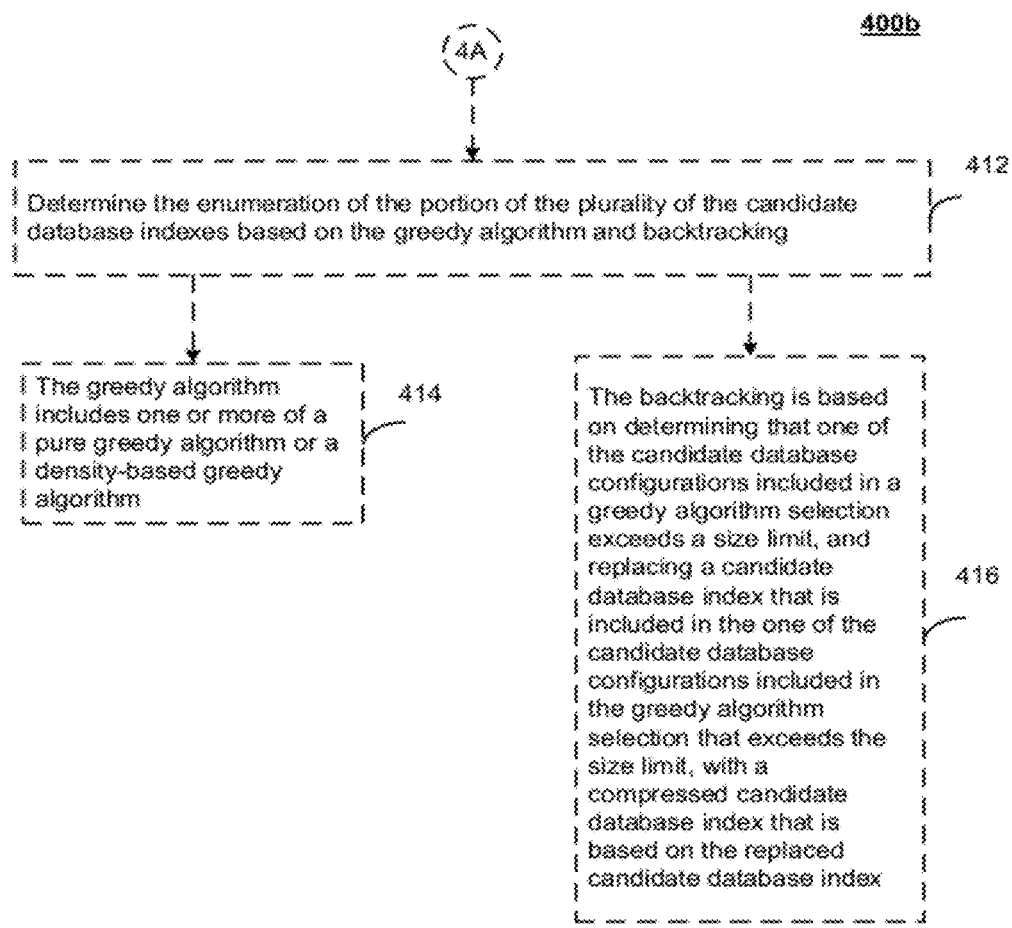

FIGS. 4a-4b are a flowchart illustrating example operations of a system for database design, according to example embodiments. In the example of FIG. 4a, a plurality of indicators representing a plurality of respective candidate database configurations, each of the candidate database configurations including a plurality of database queries and a plurality of candidate database indexes associated with a database table may be obtained (402), as discussed further below.

A portion of the candidate database indexes included in the plurality of database indexes may be selected based on skyline selection (404), as discussed further below.

An enumeration of the portion of the plurality of the candidate database indexes may be determined based on a greedy algorithm (406), as discussed further below.

According to an example embodiment, the portion of the candidate database indexes included in the plurality of database indexes may be selected based on skyline selection, based on determining a cost estimate associated with each of the respective candidate database configurations, based on index size estimates and query runtime estimates associated with each database query associated with of the respective candidate database configurations (408).

According to an example embodiment, the portion of the candidate database indexes included in the plurality of database indexes may be selected based on skyline selection, based on ranking the respective candidate database configurations, based on a combination of speed of estimated query runtime and small size determinations associated with each respective candidate database configuration (410), as discussed further below.

According to an example embodiment, the enumeration of the portion of the plurality of the candidate database indexes may be determined based on the greedy algorithm and backtracking (412), as discussed further below.

According to an example embodiment, the greedy algorithm may include one or more of a pure greedy algorithm or a density-based greedy algorithm (414), as discussed further below.

According to an example embodiment, the backtracking may be based on determining that one of the candidate database configurations included in a greedy algorithm selection exceeds a size limit, and replacing a candidate database index that is included in the one of the candidate database configurations included in the greedy algorithm selection that exceeds the size limit, with a compressed candidate database index that is based on the replaced candidate database index (416).

As mentioned above, example dictionary encoding techniques may compress a data page by finding frequently occurring values and replacing them with small pointers to a dictionary, which includes the distinct set of replaced values. For example, a data page which includes the values {AA, BB, BB, AA} may be compressed to a dictionary {AA=1, BB=2} and a compressed data page {1, 2, 2, 1}. For example, systems such as IBM DB2 may maintain one dictionary across all data pages in a table partition (e.g., a "global dictionary") while other databases (e.g., ORACLE) may maintain one dictionary per disk block (e.g., a "local dictionary"). For example, a global dictionary may provide good compression, while a local dictionary may provide greater flexibility and better update performance.

According to an example embodiment, NULL suppression may eliminate leading NULLs or blank spaces in data. For example, a database system may replace these characters with a special character and a length of the sequence of NULLs or spaces. For example, a fixed length CHAR value with many leading NULLs "00000abc" may be replaced by "@5abc" where "@" is the special character for representing compressed NULLs.

According to an example embodiment, prefix suppression may be used similarly as NULL suppression, but it may compress arbitrary prefixes instead of NULLs. For example, the values {aaabc, aaacd, aaade} share the leading prefix "aaa". Prefix compression may replace them with {@bc, @cd, @de} where "@" represents the leading "aaa". For example, systems such as MICROSOFT SQL SERVER may support NULL suppression, prefix suppression and local dictionary compression.

According to an example embodiment, a compression fraction may be estimated for use with database design techniques. For example, data compression may provide a reduced data size. Thus, estimating the size of a compressed index, (e.g., via a compression fraction (CF)) may aid in database design considerations. For example, the compression fraction may be depicted more formally as $$CF = \frac{\text{Size of compressed index}}{\text{Size of uncompressed index}} \quad (1)$$

According to an example embodiment, the compression fraction may depend on the compression technique used. For example, scanning the entire data set and running the compression technique on it may provide an accurate estimate of the compression fraction of the index; however, such computations may prove expensive on large databases.

According to an example embodiment, the compression fraction may be estimated based on statistics of columns in the index (e.g., histograms or the number of distinct values). Such statistics may be maintained by the query optimizer for purposes of cardinality estimation.

For example, random samples may be collected. For example, a sampling based estimation method for the compression fraction (e.g., referred to as SampleCF) may be used. SampleCF(I) for an index I may first acquire a random sample of the data using a given sampling fraction f (e.g. a 1% sample), and may create the index I on the sample (e.g., the index size is S). SampleCF(I) may then compress the index using the given compression method to obtain the compressed index $I^c$ (e.g., the index size is $S^c$). SampleCF may then return the compression fraction as $S^c/S$. According to an example embodiment, SampleCF may be advantageously used for NULL suppression, prefix suppression and global dictionary compression. However, although SampleCF may be more efficient than building an index on a full set of data, processing time may still be expensive in terms of obtaining a uniform random sample from the original table for each invocation of SampleCF, and generating an index on a sample (e.g., due to a cost of sorting and compression).

According to an example embodiment, techniques for compression aware physical database design discussed herein may be incorporated into database systems (e.g., MICROSOFT SQL SERVER's tool DATABASE ENGINE TUNING ADVISOR (DTA)).

Figure 5:
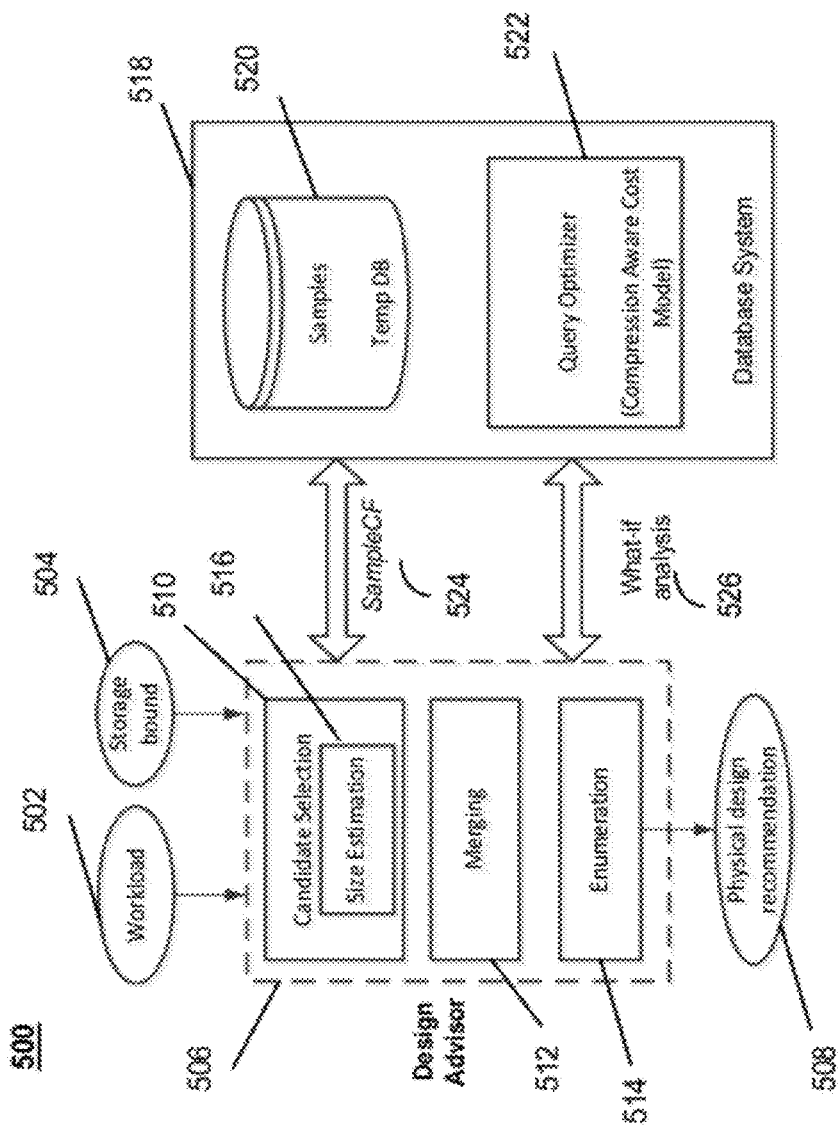
FIG. 5 depicts a block diagram of a system for compression aware physical database design.

FIG. 5 depicts a block diagram of a system 500 for compression aware physical database design. As shown in FIG. 5, a workload 502 of SQL statements and a storage bound 504 may be input to a design advisor 506, to produce as output a physical design recommendation 508 that may include compressed and uncompressed physical design structures (e.g., indexes and materialized views).

According to an example embodiment, the design advisor 506 may include candidate selection 510, merging 512, and enumeration modules 514, as discussed further herein. The candidate selection 510 module may include a size estimation 516 module.

As shown in FIG. 5, the design advisor 506 may communicate with a database system 518 (e.g., MICROSOFT SQL SERVER) that may include temporary database storage 520 that may store samples 520 such as the samples discussed herein. The database system 518 may further include a query optimizer 522 that may include a compression aware cost model.

As shown in FIG. 5, the tuning advisor 506 may communicate with the database system 518 via SampleCF 524 and a what-if analysis 526, as discussed further herein.

According to an example embodiment, a request for performing what-if analysis 526 may include transmitting a request to the query optimizer 522 to return a plan for a given query and a given (hypothetical) physical design configuration. According to an example embodiment, the compression-aware cost model may consider the CPU costs to compress and decompress data in compressed indexes, as discussed below.

Generally, an index or a materialized view (MV) may affect the performance of a database either positively or negatively. For example, an index may increase the speed performance of reads (e.g., SELECT) while it may decrease the speed performance of updates (e.g., INSERT/DELETE/UPDATE). An example technique in automatic database design, referred to as What-If analysis, may analytically quantify the benefits of having each candidate index in a system by calling the database's query cost models, and may select a set of indexes that achieve the largest benefits overall. Therefore, in providing a database design tool that may consider the effects of compressing indexes, the query cost models of the database may consider both reads and updates.

According to an example embodiment, the database system 518 (e.g., SQL SERVER) may compress data when an update operation (e.g., INSERT) modifies a page. For example, the database system 518 may include two types of compressions: ROW (null-suppression) and PAGE (local dictionary and prefix encoding). ROW suppression may include an order-independent (ORD-IND) compression while PAGE may include an order-dependent (ORD-DEP) compression. As PAGE may involve higher overheads to compress, the example database system 518 may delay applying PAGE compression even if the page belongs to a PAGE compressed index. Such a page may be first compressed with ROW compression, and then again compressed with PAGE compression when the page is "done" with modifications (e.g., page becomes full or is ejected from the bufferpool).

According to an example embodiment, a cost model for update operations on compressed indexes in the database system 518 may be adjusted in accordance with $$\text{CPUCost}_{update} = \text{BaseCPUCost} + \alpha * \#\text{tuples}_{written} \quad (2)$$

wherein BaseCost represents the existing cost model for the update operation and $\alpha$ is a constant defined for each compression type which represents the CPU cost to compress the tuple (e.g., larger for PAGE compression). According to an example embodiment, the value of $\alpha$ may be determined based on one or more benchmarks (e.g., a micro benchmark).

According to an example embodiment, when reading data in compressed indexes, the database system 518 may retrieve the index pages from the disk and may keep them compressed in a bufferpool to save memory consumption, decompressing the buffered page each time the page is read. Therefore, a read operation on a compressed index may invoke the same CPU overhead for decompression, no matter how many pages of the index reside in the bufferpool.

However, the database system 518 may avoid decompressing unused columns in the index page. For example, it may decompress only the columns that are projected, predicated or aggregated by a query. If #columnsread represents the number of such used columns in the query, an example cost model for read operations on compressed indexes may be indicated as $$\text{CPUCost}_{read} = \text{BaseCPUCost} + \beta * \#\text{tuples}_{read} * \#\text{columns}_{read} \quad (3)$$

wherein $\beta$ is a constant that represents a cost of decompressing one column data of one tuple (again, higher for PAGE compression) which may be determined by benchmarking According to an example embodiment, estimations of compressed indexes considered by a design tool may be determined based on example sampling techniques, as well as techniques based deducing the size without further sorting and compressing samples, as discussed further herein.

According to an example embodiment, physical design tools may utilize a predetermined storage bound (i.e., a space budget), thus addressing space vs. performance trade-offs. However, with compression, such trade-offs may become amplified. For example, a compressed index, although suboptimal for a particular query, may save a lot of space, thereby allowing other indexes to benefit the same or other queries. According to an example embodiment, this may affect the candidate selection techniques (e.g., candidate indexes, MVs are selected based on a per query analysis), as well as enumeration techniques (e.g., where the search for the final configuration is performed over all candidates).

According to an example embodiment, a size of an index may be estimated without actually creating the compressed index. For example, the SampleCF techniques discussed herein may reduce the cost of sampling. As a further example, example deduction techniques discussed herein may reduce the cost by avoiding invocation of SampleCF.

According to an example embodiment, SampleCF may provide size estimation based on random sampling. However, taking a uniform random sample from a large table may consume large amounts of processing capacity. Since a physical design tool may consider a large number of indexes for a workload (e.g., thousands of indexes for complex workloads), taking a random sample for estimating the size of each index may prove infeasible. According to an example embodiment, the sampling cost may be amortized across all indexes on a given table by taking a random sample only once per table. Thus, when a database design tool requests a calculation of the compressed size of an index, a check may determine whether a sample of the table already exists, and if so, the already obtained sample may be used. If not, a random sample may be taken from the original table and may be saved (e.g., in tempdb 520 of FIG. 5) for future use. According to an example embodiment, compressed indexes may be generated on this sample table to estimate their compression fraction.

According to an example embodiment, special samples for partial indexes and materialized views (MVs) with grouping and joins may be maintained based on filtering and join-synopses, as a sample of pre-joined tables.

According to an example embodiment, a size estimation framework may maintain sample tables for applying SampleCF. Although the base sample tables may be sufficient for SampleCF on simple indexes, they may be unsuitable for more complex indexes that include WHERE clauses (partial indexes), JOINs and/or GROUP-BYs (indexes on MVs). Thus, according to an example embodiment, a size estimation framework may also maintain filtered samples and MV samples.

According to an example embodiment, a filtered sample may be generated by applying the WHERE clause on the base sample table and may be used for partial indexes. For example, a partial index may be indicated as CREATE INDEX I1 ON LINEITEM (SuppKey)
    WHERE SuppKey<2000
A filtered sample may be obtained via SQL, based on
SELECT*INTO SI1 FROM SLINEITEM WHERE SuppKey<2000 where SLINEITEM is the sample table of LINEITEM.

This filtered sample may provide an estimation as far as SLINEITEM is uniformly random (not skewed with respect to the WHERE clause) and may include a reasonably large number of tuples.

However, an MV sample may be more difficult to construct. A first consideration in this regard includes the JOIN command. For example, an MV which joins LINEITEM with SUPPLIER may be indicated as CREATE VIEW MV1 AS SELECT SuppKey, Price, SuppCity
    FROM LINEITEM JOIN SUPPLIER ON (SuppKey)

According to an example embodiment, a sample for this MV may be obtained by joining two sample tables, which may be indicated as SELECT SuppKey, Price, SuppCity INTO SMV1
    FROM SLINEITEM JOIN SSUPPLIER ON (SuppKey)

However, this may provide few tuples in the MV sample, as each base sample is obtained randomly and may not include tuples that match the foreign key values. To address this concern, a join synopsis of the database may be generated, and may be applicable for Key-Foreign Key join views.

According to an example embodiment, when the framework is initialized, a random sample of fact tables (e.g., LINEITEM) may be obtained. Next, the sample fact table may be joined with the original dimension tables so that foreign key values have matching tuples, resulting in a wide joined sample. According to an example embodiment, such join synopses may be used to create MV samples when the database design tool requests them. For example, an MV sample for MV1 may be obtained by running the same SQL as discussed above, but on the joined synopses. Then, compressed indexes may be generated on the sample to estimate the compressed size of indexes on the MV.

According to an example embodiment, materialized views with GROUP BY and aggregation may be included in design considerations. To estimate the size of a compressed index, the number of entries (tuples) in the index may be obtained. Although the base table's statistics may be used for simple indexes, it may be desirable to estimate how many distinct groups the MV will have. For example, an MV and its MV sample may be indicated as CREATE VIEW MV2 AS SELECT ShipDate, SUM
    (Price)
    FROM LINEITEM
    GROUP BY ShipDate
SELECT ShipDate, SUM(Price) INTO SMV2
    FROM SLINEITEM GROUP BY ShipDate For example, SMV2 may include approximately 1,000 tuples. If the number of tuples scales up to the sampling ratio (e.g., SLINEITEM may include 1% of LINEITEM), the MV may include approximately 100K tuples. However, an actual number of tuples in the MV may approximate 2,000 (the number of distinct SHIPDATE values). Thus, unlike partial indexes, a distribution of distinct values may be considered in estimating the number of tuples in MVs.

For example, a query indicated as

SELECT COUNT (DISTINCT ShipDate) FROM LINEITEM may be invoked, but running such a query for every candidate MV in the database design tool may prove to be an expensive operation. According to an example embodiment, the query optimizer may be asked to estimate the number of tuples returned by the query that defines the MV. The query optimizer may answer the estimate based on statistics of each column. However, this estimate may be inaccurate, as MVs may aggregate on more than one column and the query optimizer 522 may assume independence between the columns unless multi-column statistics are collected (involving scanning the table). An MV sample may thus be obtained, as shown in Algorithm 1 below.

Algorithm 1
Algorithm 1: CreateMVSample ( )

a. SELECT <MV-Project>, COUNT(*) AS cnt INTO $S_{MV}$
   FROM <join-synopses> WHERE <MV-WHERE>
   GROUP BY <MV-GROUP BY>.
b. r = SELECT SUM(cnt) FROM $S_{MV}$
c. d = SELECT COUNT(*) FROM $S_{MV}$
d. FilterFactor = r / <join-synopses>.#tuple
e. n = RootTable.#tuple * FilterFactor
f. f = SELECT cnt AS frequency, COUNT(*) AS value
   FROM $S_{MV}$ GROUP BY cnt
g. MV.#tuple = AdaptiveEstimator(f, d, r, n);

As shown, Algorithm 1 above may address this issue without adding overheads to the design tool. For example, a DBMS may expect an MV with aggregation to include a COUNT(*) column in its definition (or internally add as a hidden column) for incremental maintenance. The DBMS may increase or decrease the counter when a newly inserted or deleted tuple falls into the group, and may eliminate the group when the counter reaches zero. According to an example embodiment, this information may be used as frequency statistics for distinct value estimators.

According to an example embodiment, a distinct value estimator (e.g., Adaptive Estimator) may provide an estimated number of distinct values based on frequency statistics $f=\{f_1, f_2, \ldots f_k\}$ where $f_k$ represents the number of distinct values that appear k times in the random sample. For example, the statistics may be obtained by querying on the MV sample and aggregating on the COUNT column. Additionally, r and d may be determined (the number of tuples in the MV sample before and after the aggregation respectively) as well as n, the number of tuples in the original table. According to an example embodiment, an Adaptive Estimator may accept these values as inputs and may determine the estimated number of tuples in the MV. According to an example embodiment, these estimates may be preserved in storage for each MV sample taken.

According to an example embodiment, indexes may be generated on the join synopses. For example, this technique may speed up querying on them, for creating MV samples. According to an example embodiment, indexes on primary keys and foreign keys may speed up this process.

According to an example embodiment, example techniques discussed herein may deduce the size of a compressed index based on other indexes whose sizes are known. For example, such example deduction techniques may incur minimal cost to estimate the size of an index.

According to an example embodiment, deduction of an index size may depend on a type of compression scheme. For example, compression techniques discussed herein may be described as belonging to one of two groups: Order-Independent (ORD-IND) and Order-Dependent (ORD-DEP) compression techniques. For example, ORD-IND compressions such as NULL-suppression and global dictionary encoding may produce compressed indexes having the same (or approximately the same) compressed size regardless of the order of tuples in the index page, while ORD-DEP compressions such as local dictionary encoding and run length encoding (RLE) may be sensitive to the order of tuples, or the value distribution in each page.

For example, compressed indexes $CI_{AB}$, $CI_{BA}$ may be based on two columns A, B. As shown in FIG. 6, the ordering of tuples in the two composite indexes is different. However, NULL-suppression suppresses the same total number of NULLs in both cases. Similarly, global dictionary encoding may generate the same (or approximately the same) dictionary for the two indexes and may replace the same (or approximately the same) number of entries with pointers to the dictionary (based on a DBMS that generates a dictionary per column).

According to an example embodiment, a column set deduction (ORD-IND) technique may deduce the size of $CI_{AB}$ from that of $CI_{BA}$ as $Size(CI_{AB})=Size(CI_{BA})$, since the order of data does not affect the compressed size. More generally, every two indexes compressed in ORD-IND may have the same (or approximately the same) size if they include the same set of columns.

According to an example embodiment, column set deduction (ColSet deduction) may be useful for clustered indexes. All clustered indexes on the table may have the same (or approximately the same) compressed size because all include the same set of columns. Thus, SampleCF may be avoided for all but one clustered index per table.

According to an example embodiment, a column extrapolation (ORD-IND) technique (e.g., ColExt) may estimate the size of a composite index from subsets of the index. For example, a user may wish to estimate $Size(CI_{AB})$, and $Size(CI_A)$ and $Size(CI_B)$ may already be available. $R(I_{AB})$ may represent the size reduction achieved by compressing $I_{AB}$ (i.e., $R(I_{AB})=Size(I_{AB})-Size(CI_{AB})$). If the compression is ORD-IND, then $R(I_{AB})$ may be estimated from $R(I_A)$ and $R(I_B)$ as $R(I_{AB})=R(I_A)+R(I_B)$ because ORD-IND achieves the same (or approximately the same) size reduction for each column. Therefore, $Size(CI_{AB})$ may be determined as $$Size(CI_{AB})=Size(I_{AB})-R(I_A)-R(I_B). \quad (4)$$

Figure 6A:
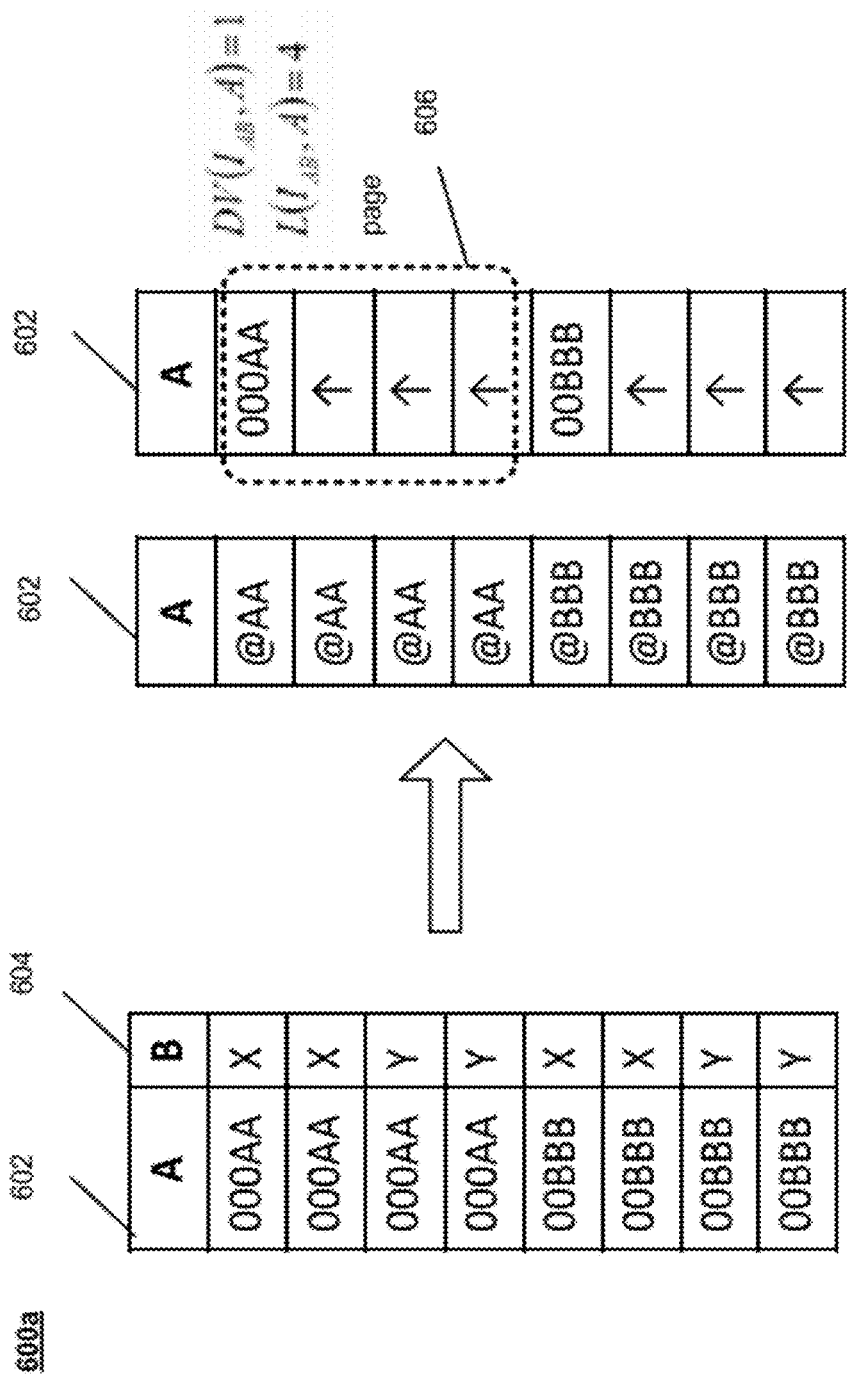
FIGS. 6a-6b depict database columns with order independent/order dependent compression.
Figure 6B:
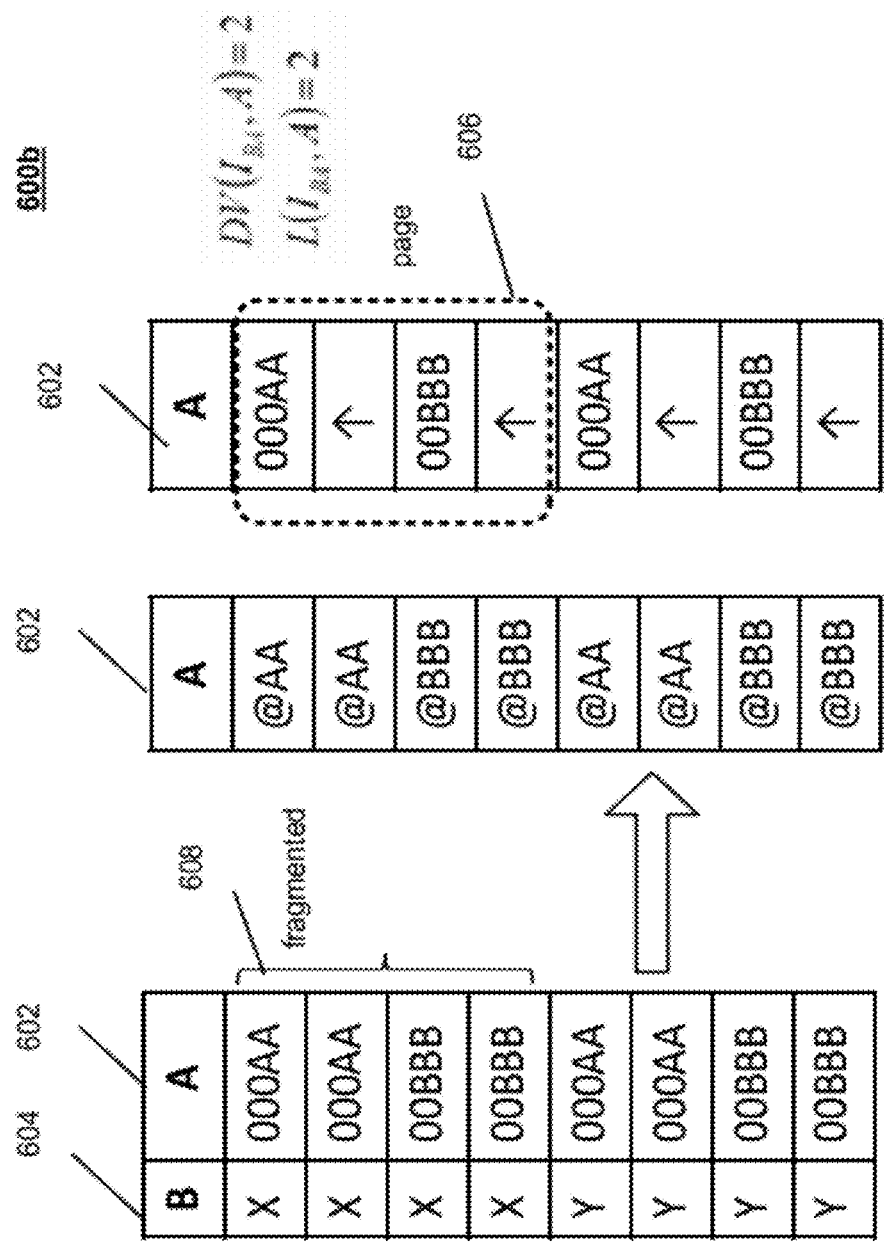

FIGS. 6a-6b depict database columns with order independent/order dependent compression. As shown in FIG. 6a, a column A 602 and a column B are associated with an index $I_{AB}$, with predetermined storage allocated for a page 606. According to an example embodiment, a column extrapolation (ORD-DEP) technique may be performed for compression such as page-local dictionary encoding. However, the column extrapolation may not be based on a simple summation of reductions for ORD-DEP compression. As shown in FIG. 6a, the order of values of the column A 602 in $I_{AB}$ may be same as $I_A$ while that in $I_{BA}$ may be fragmented 608 by the leading column B 604, reducing the number of repeating values of A 602 in each page 606, as shown in FIG. 6b.

According to an example embodiment, to account for the fragmentation 608, the average number of distinct values in each page may be estimated and the size reduction attributed to following columns may be penalized.

For example, $DV(I_X, Y)$ may represent an average number of distinct values of a column Y and $T(I_X)$ may represent a number of tuples in a page of an index $I_X$. According to an example embodiment, the average fraction of Y replaced by the dictionary may be indicated as $$F(I_X, Y) = \frac{T(I_X) - DV(I_X, Y)}{T(I_X)}. \quad (5)$$

For example, $T(I_{AB})=4$, $DV(I_{AB}, A)=1$, and $F(I_{AB}, A)=3/4$ of the values of A were eliminated. The size of $I_{BA}$ may be deduced from $I_A$ and $I_B$, so that $R(I_A)$ and $R(I_B)$ may be known. As the space saving of compression may be linear to the number of values replaced by the dictionary, $$R(I_{AB}) = R(I_B)\frac{F(I_{BA}, B)}{F(I_B, B)} + R(I_A)\frac{F(I_{BA}, A)}{F(I_A, A)}. \quad (6)$$

As B is the leading key of $I_{BA}$, its value distribution in pages may equal that of $I_B$, thus $F(I_{BA}, B)=F(I_B, B)$. The value distribution of A may be fragmented by B, and thus, $F(I_{BA}, A)<F(I_A, A)$.

In determining $F(I_{BA}, A)$ and $F(I_A, A)$ (i.e., $DV(I_{BA}, A)$ and $DV(I_A, A)$), the average run length of a value of A in $I_{BA}$ and $I_A$ may be considered. For example, $L(I_X, Y)$ may represent the average run length of a value of Y in $I_X$. For example, $L(I_{BA}, A)=2$, $L(I_A, A)=L(I_{AB}, A)=4$, as shown in the example of FIGS. 6a-6b.

According to an example embodiment, the values may be approximated with cardinality statistics as:

$$L(I_A, A) = \left\lfloor \frac{\#\ TotalTuples}{|A|} \right\rfloor,\ L(I_{BA}, A) = \left\lfloor L(I_A, A)\frac{|A|}{|AB|} \right\rfloor \quad (7)$$

In accordance with the example of FIGS. 6a-6b, approximated values may be indicated as $L(I_A, A)=8/2=4$ and $L(I_{BA}, A)=4*2/4=2$. According to an example embodiment, in determining $L(I_{BA}, A)$, $L(I_A, A)$ is not divided by $|B|$ because A and B may be correlated, i.e., $|A|/|AB|<<|B|$.

According to an example embodiment, the number of distinct values may be approximated as:

When $L(I_X, Y) > 1$, $DV(I_X, Y) = \left\lceil \dfrac{T(I_X)}{L(I_X, Y)} \right\rceil$ (8)

For example, $DV(I_{BA}, A) = 4/2 = 2$.

If $L(I_X, Y) \leq 1$, $DV(I_X, Y) = |Y| - |Y|\left(1 - \dfrac{1}{|Y|}\right)^{T(I_X)}$ (9)

which corresponds to an expected number of distinct sides when throwing a |Y|-sided dice $T(I_X)$ times.

According to an example embodiment, this estimation may also be used with run length encoding (RLE) compression.

According to an example embodiment, deduction may provide techniques that may eliminate some SampleCF calls and may thus reduce the cost of index size estimation. However, both SampleCF (when using a low sampling fraction) and deduction may result in size estimation errors.

A database design tool may evaluate a large number of indexes. Inefficient size estimation may thus lead to suboptimal runtime of the tool. For example, an index size estimation without deduction techniques may generate a dominating overhead on a database design tool. Thus, it may be desirable to determine an optimal sample size for SampleCF and an optimal strategy with regard to selection of indexes for estimation using SampleCF, and selection of indexes for estimation using deduction.

However, an erroneous size estimation may lead to a decrease in design quality because the compression fraction of a compressed index may impact the beneficial usefulness of the index. Therefore, a trade-off between accuracy and performance may be balanced. According to an example embodiment, this problem may be expressed as an optimization problem, and an example graph search algorithm may be used as a solution to the problem, as discussed further herein.

For example, a problem of index size estimation may be indicated as shown below.

According to an example embodiment, inputs to the problem include a set of indexes whose sizes need to be estimated (e.g., indicated as targets), a tolerable error ratio e and a confidence parameter q such that the estimated sizes of the targets have errors less than e for at least q probability.

According to an example embodiment, outputs from the solution to the problem include a sampling ratio f (e.g., fraction of table to sample) and the deduction strategy that minimizes the total cost of size estimation without violating the accuracy constraint.

For example, when e=20% and q=95%, the estimated size of a compressed index whose size is 100 MB may include values between 120 MB and 83.3 MB for at least 95% probability. Higher e and lower q may allow a smaller sample size and more deductions, and may therefore be faster at the cost of accuracy. For determining whether an estimate satisfies the accuracy constraint, its error may be quantified as discussed below.

According to an example embodiment, a sample-based size estimation technique may lead to an arbitrary error. However, according to an example embodiment, an expected error (bias) and its variance may be inferred. For example, SampleCF for NULL suppression encoding may be unbiased and may have at most $1/rf^2$ variance where f represents a sampling ratio and r represents the number of sampled tuples.

According to an example embodiment, $X_A$ may represent a random variable to denote a result of size estimation for $I_A$ divided by its true size. Thus, $X_A=1$ may represent a most accurate estimation. For example, for an index $I_{AB}$ for which the size of $I_{AB}$ may be inferred from $I_A$ and $I_B$ with ColExt, a deduced result may be indicated as $X_{AB}=X_A X_B X_{ColExt}$ where $X_{ColExt}$ is the random variable to denote the result of the deduction for perfectly accurate inputs (sizes of $I_A$ and $I_B$), in order to account for amplified errors by deduction. The variance of such a product of random variables may be determined as $$\prod_i (V(X_i) + E(X_i)^2) - \prod_i (E(X_i)^2)$$ (10)

and the expected value may be determined as the product of each expected value. The probability that the error of the estimation is within e as may then be indicated as the integral of a normal probability distribution between [1/(1+e),1+e] with the bias and variance.

According to an example embodiment, a cost of index size estimation may be modeled as the amount of data for indexing. A cost of SampleCF on an index may be indicated as the number of data pages in the index before compression. Hence, SampleCF on wider indexes with larger samples may cost more than narrow indexes. The cost of deduction may be indicated as zero (or approximately zero).

In many situations, a database may already have a compressed index before running the database design tool. Such an index may provide an accurate size of itself from the database statistics. Hence, such an index may be indicated as having zero (or approximately zero) bias and variance, as well as zero (or approximately zero) cost for size estimation.

Figure 7:
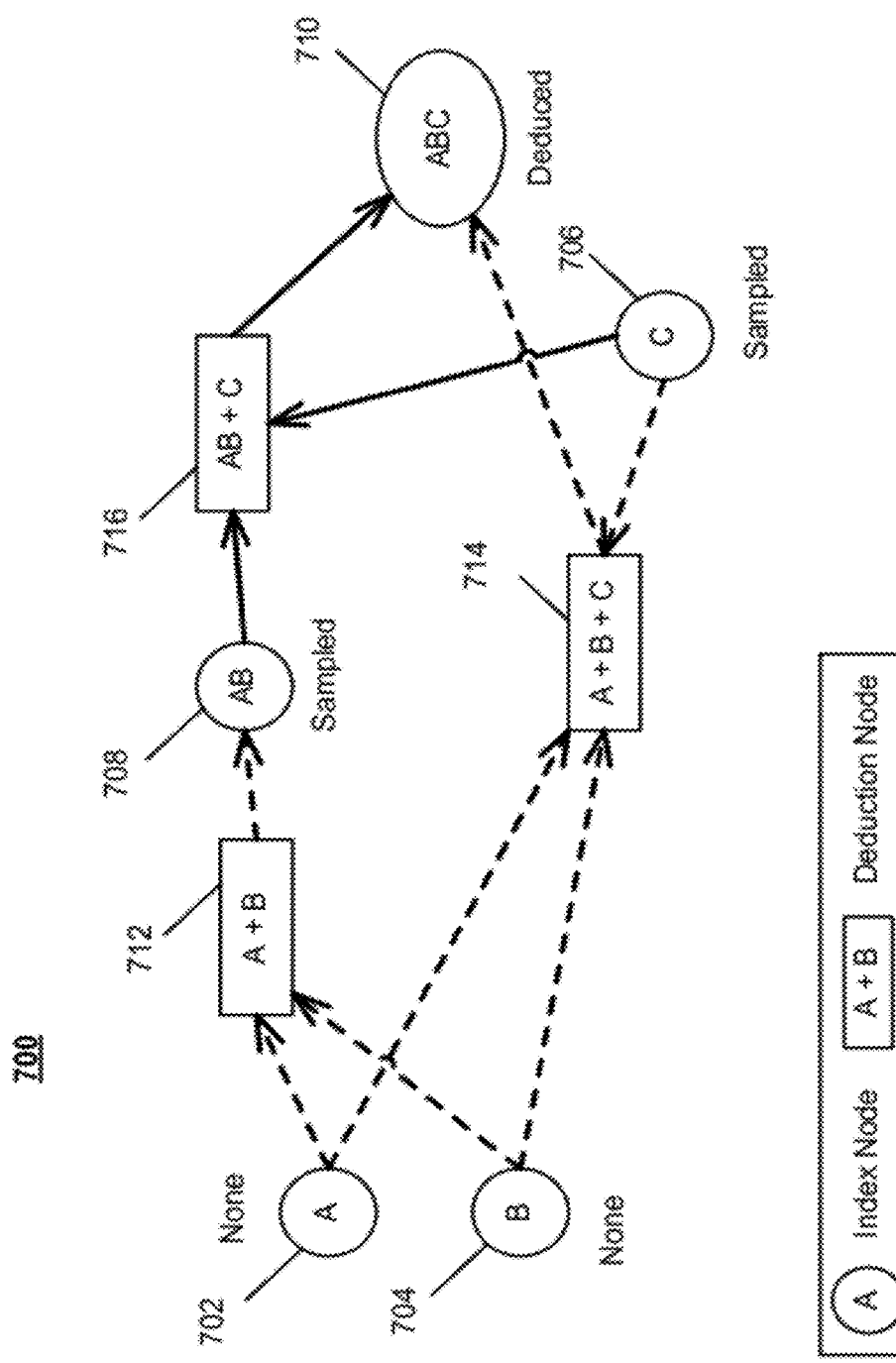
FIG. 7 depicts a directed graph of index and deduction nodes.

FIG. 7 depicts a directed graph of index and deduction nodes. According to an example embodiment, a solution to the problem may be indicated in terms of a directed graph problem as depicted in FIG. 7, and as described by an Algorithm 2 as shown below.

---

Algorithm 2
Algorithm 2: Graph Search Algorithm a. Add existing indexes to the graph with SAMPLED state.
b. Add target indexes to the graph with NONE state;
c. foreach(target) { // from narrower to wider
d.     Add all child deduction nodes of this node to the graph;
e.     Add children of the deduction nodes, if not yet added;
f.     if (any deduction is already enabled and satisfies the constraint with the given f, e and q) {
g.         Mark this node DEDUCED from the deduction node; (if multiple deductions are eligible, pick the one with the highest probability)
h.     } else if (any deduction can be enabled by doing SampleCF on its children such that the sum of their costs is lower than the cost of sampling this node) {
i.         Mark this node DEDUCED from the deduction node and mark its children SAMPLED; (if multiple deductions are eligible, pick the one with the least cost)
j.     } else {
k.         Mark this node SAMPLED;
l.     }}
m. foreach (enabled index) //from wider to narrower
n.     if (not targeted nor used by parents) Remove the node;

---

As shown in FIG. 7, the graph may include two types of nodes, indicated as index nodes 702, 704, 706, 708, 710, and deduction nodes 712, 714, 716. According to an example embodiment, an index node (e.g., "AB") may represent the size estimation for an index and may have one of three states, indicated as NONE, DEDUCED and SAMPLED. For example, NONE may be an initial state of all index nodes wherein the size of the index is not estimated (step 2 of Algorithm 2). For example, DEDUCED and SAMPLED states may indicate that the size is estimated by deduction and SampleCF, respectively. According to an example embodiment, edges may connect index nodes from/to deduction nodes. For example, a node from which an edge emerges may be indicated as a child node (e.g., nodes 702, 704, 706, 708, 712, 714, 716), and a node at which the edge is directed may be indicated as a parent node (e.g., nodes 708, 710, 712, 714, 716).

According to an example embodiment, a deduction node may represent a possible deduction to estimate the size of its parent based on its children. For example, the deduction node "A+B" (712) has a parent index node "AB" 708 (the index whose size can be deduced) and child index nodes "A" 702 and "B" 704 (indexes using a deduction that can be performed). According to an example embodiment, a deduction node may be enabled only when all its children are DEDUCED or SAMPLED (i.e., their sizes are known). As shown in FIG. 7, the deduction node 716 is enabled, as its children 708, 706 are both indicated as SAMPLED.

According to an example embodiment, the directed graph of FIG. 7 may be used to determine an assignment of the states to each node such that all target indexes are marked as DEDUCED or SAMPLED, and also satisfy a desired level of accuracy (i.e., error constraints).

As shown in the example of FIG. 7, $I_{ABC}$ (e.g., node 710) and $I_{AB}$ (e.g., node 708) may be indicated as target indexes. The solution shown in FIG. 7 is to SampleCF on $I_{AB}$ (e.g., node 708) and $I_C$ (e.g., node 706) and then deduce the size of $I_{ABC}$ (e.g., node 710) from the samples. Compared to SampleCF on $I_{AB}$ and $I_{ABC}$, this solution may provide less accuracy on the size estimation of $I_{ABC}$, due to the deduction.

However, since building a sample composite index on ABC may cost more than building on C, the solution may be better unless the error constraint is too tight to allow the deduction. According to an example embodiment, another possible solution may include a SampleCF on all singleton indexes and a deduction of the size of $I_{AB}$ and $I_{ABC}$. For this solution, candidates for deducing the size of $I_{ABC}$ may include A+B+C and AB+C.

A determination of a "better" deduction may depend on the states of children of their deduction nodes, as errors may be recursively calculated from children to parents. As there exist a potentially large number of target indexes, an exact algorithm for determining an optimal solution may prove to be infeasible. Thus, an example heuristic technique may be used, as discussed below.

As a background consideration of an example technique, indexes considered in a design tool may be correlated as the technique exhaustively considers syntactically relevant indexes for each query. For example, when $I_{AB}$ is considered, $I_A$ and $I_B$ may also be considered and vice versa. Thus, narrower indexes may be considered first, and a passive examination may be conducted to determine an opportunity to deduce wider indexes from the narrower indexes.

According to an example embodiment, an example technique may be run with a few f and one solution with the smallest total cost among valid results may be selected. It may be observed that some combination of f, e and q provides an invalid result where even directly applying SampleCF on all targets does not satisfy the accuracy constraint. However, the example technique may achieve smaller total cost while maintaining a good accuracy of size estimation.

Figure 8:
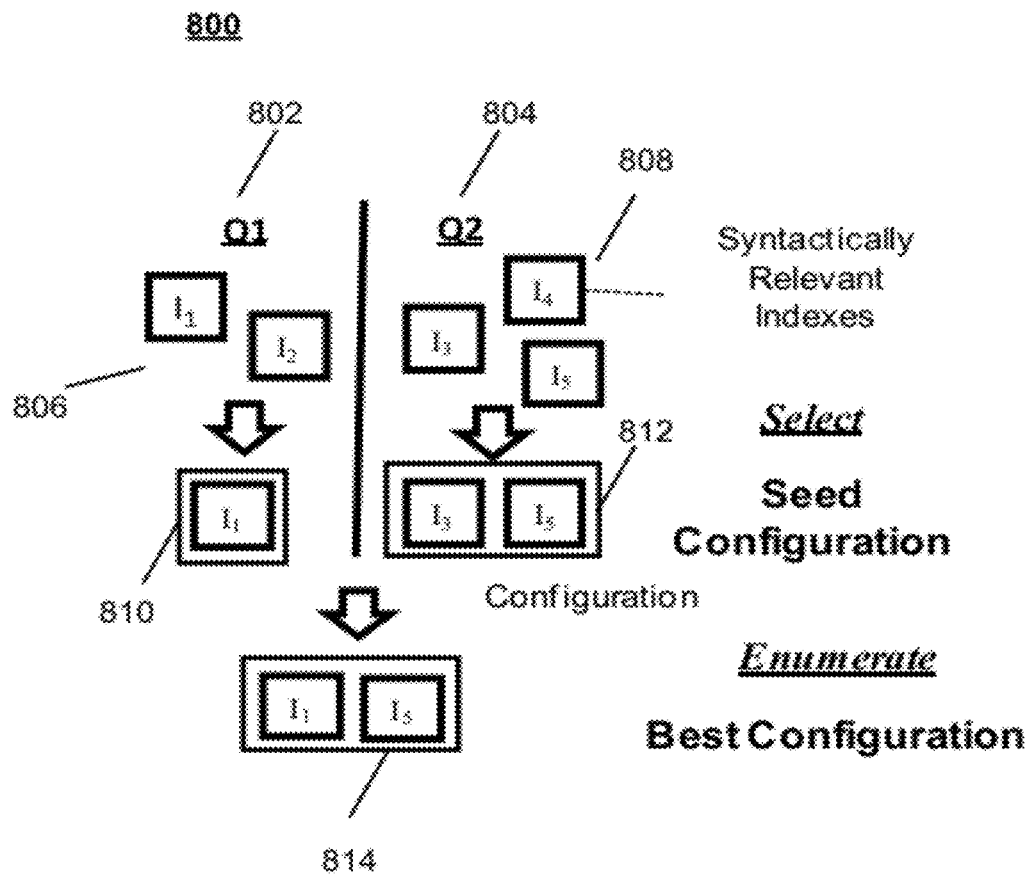
FIG. 8 is a block diagram illustrating an architecture of a database design tool.

FIG. 8 is a block diagram illustrating an architecture of a database design tool. Candidate selection and enumeration in database design may involve consideration of compression techniques, as discussed herein. An example architecture 800 of a database design tool generally may be discussed with regard to FIG. 8. First, the architecture 800 may separately examine each query 802, 804 in a workload and generate a set of syntactically relevant indexes 806, 808 for the query 802, 804. Next, it may select a configuration 810, 812 that most speeds up the query 802, 804. Such a configuration 810, 812 may be referred to as a seed configuration. The seed configurations 810, 812 may then be jointly analyzed to enumerate the final set of indexes 814 within the space budget.

While it may be possible to generate compressed variants of all syntactically relevant indexes 806, 808 without changing the candidate selection and enumeration logics, such an approach may not capture a database design that fully exploits the benefits of compressed indexes.

A number of all syntactically relevant indexes may be large, although few of them may be useful. Therefore, a design tool may select a few small seed configurations by picking a configuration that performs fastest for each query. This best-per-query approach may work well for a large space budget, but may result in designs that speed up only a small number of queries with a tight space budget. Such techniques may not capture space efficient indexes that are not the "best" in terms of query performance, but which may achieve the best overall performance as they may include more indexes for other queries.

Compression may make this space-performance trade-off even more prominent. Compressed indexes may not be the fastest indexes due to their decompression CPU costs. For example, a selection method may miss many useful compressed indexes except for indexes with good compression fractions that may negate the decompression cost by the reduced I/O cost.

Figure 9:
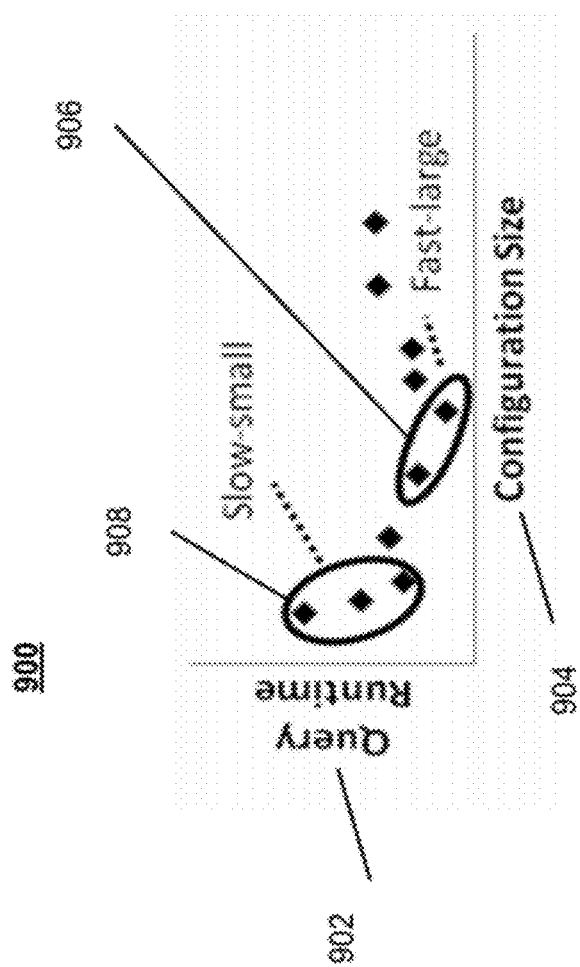
FIG. 9 is a graph illustrating effect of skyline candidate selection.

FIG. 9 is a graph illustrating effect of skyline candidate selection. According to an example embodiment, rather than choosing only the fastest configuration, a skyline selection technique may be used. For example, a selection may include configurations on the skylines of query runtime 902 and configuration size 904 for each query. Thus, a spectrum of indexes ranging from fast-large 906 to slow-small 908 may be captured, as illustrated in FIG. 9. According to an example embodiment, the skyline for each query may be generated, based on measuring the expected cost of all candidate configurations. Then, for each candidate configuration, it may be determined whether there exists any other configuration that performs faster and also is smaller. If one exists, the current candidate configuration may be considered as dominated and may be removed from the skyline.

An overhead for generating the skyline may be indicated as $O(n^2)$ where n represents the number of configurations for each query. According to an example embodiment, the skyline selection along with the backtracking described further below may provide the benefits of compressed indexes in a tight space budget. Across all indexes of all seed configurations, enumeration selects a "best" set of indexes that speed up the query workload and also satisfy the space budget.

Figures 10A, 10B:
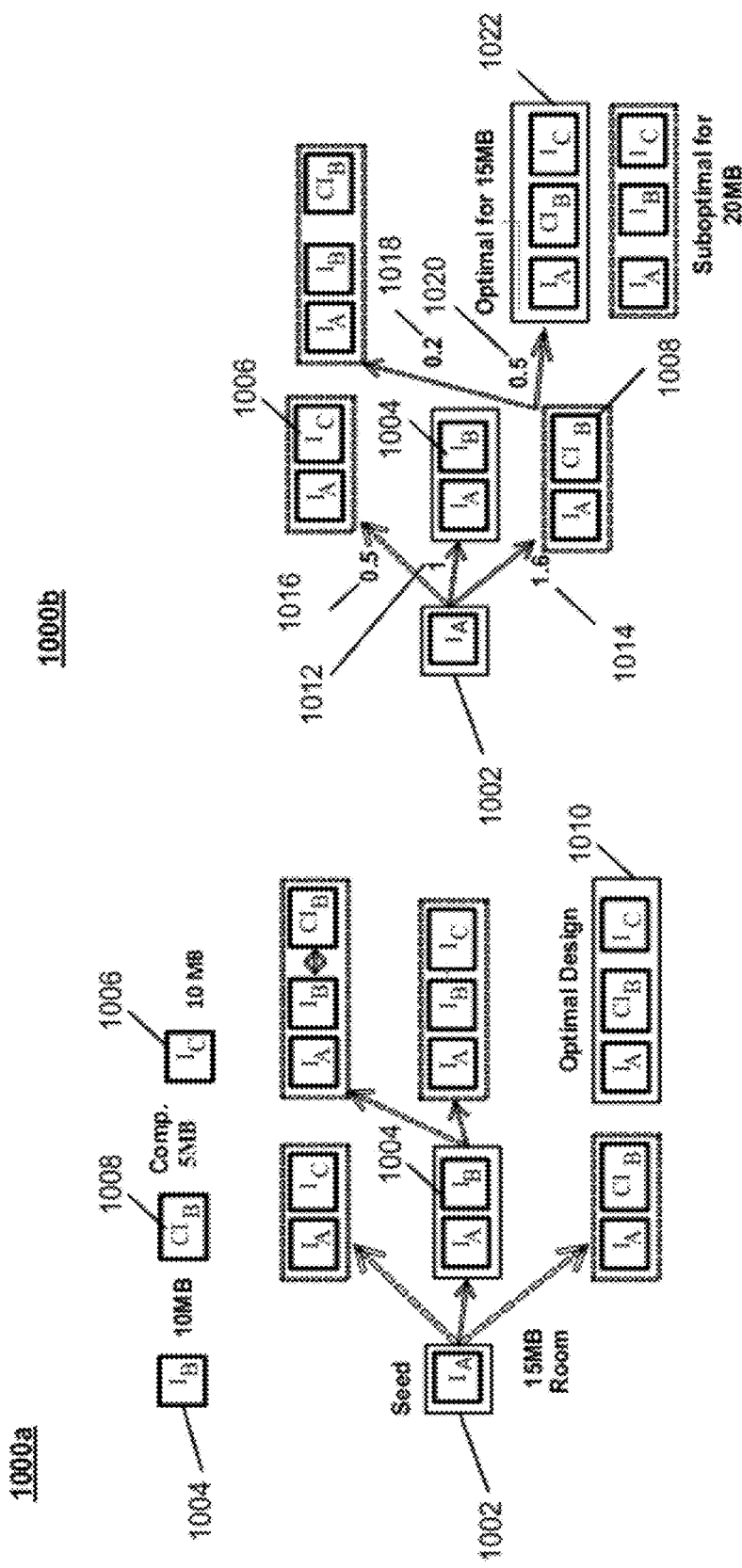
FIGS. 10a-10b are a block diagram illustrating stages of a greedy algorithm.

FIGS. 10a-10b are a block diagram illustrating stages of a greedy algorithm. As shown in FIGS. 10a-10b, the greedy algorithm starts from each seed configuration 1002 ($I_A$ in this case) and keeps adding indexes that provide optimal benefits at each step. At the first step, adding $I_B$ 1004 proves to be the fastest, thus $I_B$ 1004 may be added, and the technique advances. However, at the next step, 15-10=5 MB remains in the budget. Thus, adding $I_C$ 1006 will exceed the budget, but adding a compressed index $CI_B$ 1008 is meaningless because $I_B$ 1004 is faster without compression. Although an optimal design 1010 includes $CI_B$ 1008 and $I_C$ 1006, as shown, the greedy algorithm may not provide this solution.

This situation may occur with heavily compressed clustered indexes, as they may save a large space by compressing the entire table but may perform slowly with queries. As one table may include one clustered index (otherwise the design is infeasible), the pure greedy approach may not improve the design if an uncompressed clustered index is selected in an earlier step. A similar problem may result from competing indexes which speed up the same queries but only one of them can be used at the same time, as $I_B$ 1004 and $CI_B$ 1008 in the above example. It may be possible to avoid the suboptimal choice by considering the density at each greedy step, selecting the index that has the highest benefit divided by its size.

For simplicity, one query may be considered. For this example, indexes $I_B$ 1004, $CI_B$ 1008, and $I_C$ 1006 may speed up the query for 10, 8 and 5 seconds, respectively. The density of these indexes at a first greedy step is 10/10=1, 8/5=1.6 and 5/10=0.5 (1012, 1014, 1016), respectively. Thus, $CI_B$ 1008 may be selected at this step. At the next step, the benefit of adding $I_C$ 1006 is still 5 seconds while that of adding $I_B$ 1004 is 2 ($=10^{-8}$) seconds because the slower but competing index $CI_B$ 1008 is included. The density of $I_B$ 1004 and $I_C$ 1006 are 2/10=0.2 and 0.5 (1018, 1020), thus $I_C$ 1006 is selected at this step, resulting in an optimal design 1022.

However, the density based greedy technique as shown results in the same design even for a 20 MB space budget where the optimal design is $I_B$ 1104 and $I_C$ 1006. Further, a density based approach may add many small indexes that may add little benefit, which may generate a suboptimal design for larger budgets.

Figure 11:
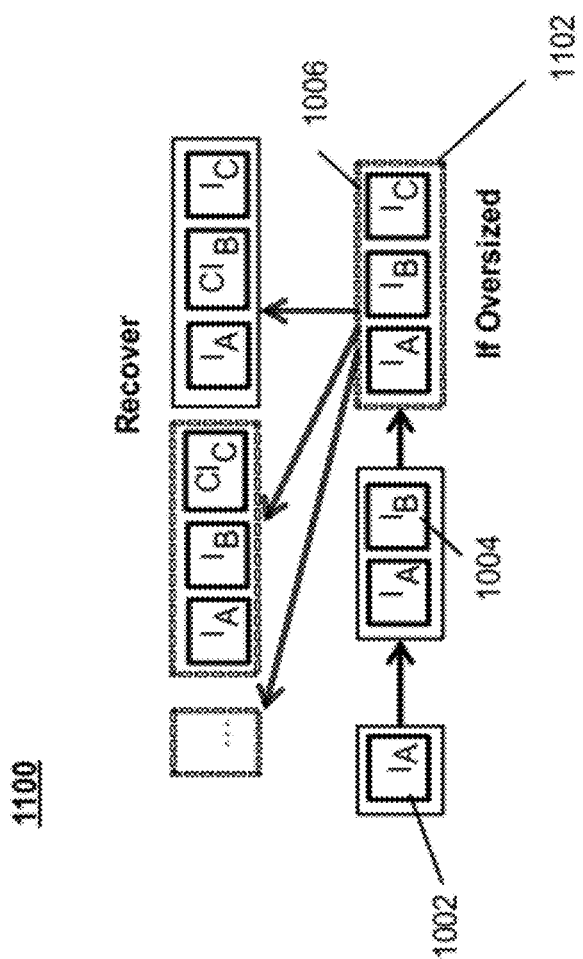
FIG. 11 is a block diagram illustrating a backtracking technique to recover an oversized greedy selection.

FIG. 11 is a block diagram illustrating a backtracking technique to recover an oversized greedy selection. In order to capture the optimal design in both tight and plentiful space budgets, a backtracking phase may be added to the pure greedy approach. As shown in FIG. 11, the example technique operates like the pure greedy technique until a greedy choice 1102 exceeds the space budget. Such an oversized configuration was not considered in the original greedy analysis, but recovery may be attempted by replacing an index in the configuration with its compressed variant. For example, a consideration may be made of replacing each index and choosing a replacement with faster performance while making the configuration below the budget. The recovered configuration may then be compared with other greedy choices.

According to an example embodiment, a database design with more indexes and heavier compression may be used for SELECT intensive workloads while a database design with fewer indexes and lighter compression may be used for INSERT intensive workloads because of the overheads to maintain indexes against INSERT statements, as discussed above.

Thus, example techniques discussed herein may provide database design tools that may consider compressed and uncompressed database structures in determinations of optimal designs.

Implementations of the various techniques described herein may be implemented in digital electronic circuitry, or in computer hardware, firmware, software, or in combinations of them. Implementations may implemented in a propagated signal, or, alternatively, as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor; and
   a design manager embodied via executable instructions stored on a machine readable storage device for execution by the at least one processor, the design manager including:
      a request receiving engine that receives a request for an estimate size of a first compressed index associated with a first database index that is based on a database table;
      a base index engine that obtains a plurality of values indicating sizes of a plurality of second compressed indexes associated with a plurality of respective second database indexes other than the first database index, the second database indexes based on the database table;
      a table sample locator that determines whether a database table sample associated with the database table is stored in a table sample storage device;
      a sample storage engine that initiates storage of a random sample, as the database table sample in the table sample storage device, the random sample including a subset of rows included in the database table,
      the base index engine obtaining the plurality of values based on one or more compression fraction values associated with the database table sample; and
      a size estimate engine that determines the estimate size of the first compressed database index based on one or more of the plurality of values.

2. The system of claim 1, wherein:
   the database table is included in a relational database system.

3. The system of claim 1, further comprising:
   a column set determination engine that determines a first set of table columns associated with the database table, wherein the first database index is based on the first set of table columns;
   a compression type engine that determines that a compression associated with the requested estimate size associated with the first compressed index generates compressed indexes that share a common compressed size independent of an ordering of tuples associated with database table columns; and
   an index selection engine that selects one of the second database indexes that is, in common with the first database index, based on the first set of table columns, wherein
   the size estimate engine determines the estimate size of the first compressed database index based on deducing the estimate size of the first compressed database index based on the value indicating the size of the compressed index associated with the selected one of the second database indexes.

4. The system of claim 3, wherein:
   the compression associated with the requested estimate size includes one or more of:
   null suppression or global dictionary compression.

5. The system of claim 1, further comprising:
   a column set determination engine that determines a first set of table columns associated with the database table, wherein the first database index is based on the first set of table columns;
   a compression type engine that determines that a compression associated with the requested estimate size associated with the first compressed index generates compressed indexes that share a common compressed size independent of an ordering of tuples associated with database table columns; and
   an index selection engine that selects one or more of the second database indexes that are based on one or more of the table columns included in one or more subsets of the first set of table columns, wherein
   the size estimate engine determines the estimate size of the first compressed database index based on extrapolating the estimate size of the first compressed database index based on determining one or more size reduction values for each selected second database index, based on determining differences between the value indicating the size of the compressed index associated with the selected one of the second database indexes and a value indicating the size of the selected one of the second database indexes.

6. The system of claim 1, further comprising:
   a column set determination engine that determines a first set of table columns associated with the database table, wherein the first database index is based on the first set of table columns;
   an index selection engine that selects one or more of the second database indexes that are based on one or more of the table columns included in one or more subsets of the first set of table columns, wherein
   the size estimate engine determines the estimate size of the first compressed database index based on extrapolating the estimate size of the first compressed database index based on an order-dependent column extrapolation, based on
      determining one or more run lengths of values stored in one or more columns of the selected one or more of the second database indexes, and
      determining at least one penalty value associated with a size reduction that is associated with one or more columns of the selected one or more of the second database indexes.

7. The system of claim 6, wherein:
   a compression associated with the requested estimate size includes one or more of:
   page-local dictionary encoding or run length encoding.

8. The system of claim 1, further comprising:
   a table sample retrieval engine that obtains the database table sample, based on a first result of the determination of whether a database table sample associated with the database table is stored in the table sample storage device; and
   a table sample determination engine that obtains the random sample from the database table, based on a second result of the determination of whether a database table sample associated with the database table is stored in the table sample storage device, the random sample including the subset of rows included in the database table.

9. The system of claim 8, further comprising:
   a partial index sample locator that determines whether a partial index table sample associated with a database partial index associated with the database table is stored in the table sample storage device;

a partial index sample engine that obtains the partial index table sample, based on a first result of the determination of whether the partial index table sample is stored in the table sample storage device;

a filtered sample determination engine that obtains a filtered sample from the database table sample, based on a second result of the determination of whether the partial index table sample is stored in the table sample storage device; and a filtered sample storage engine that initiates storage of the filtered sample obtained by the filtered sample determination engine, as the partial index table sample in the table sample storage device.

10. The system of claim 8, further comprising:

a materialized view sample locator that determines whether a materialized view sample associated with a materialized view associated with the database table is stored in the table sample storage device;

a materialized view sample determination engine that obtains the materialized view sample, based on a first result of the determination of whether the materialized view table sample is stored in the table sample storage device;

a join synopsis determination engine that obtains a plurality of join synopses of a database associated with the database table, based on a second result of the determination of whether the partial index table sample is stored in the table sample storage device; and a join synopsis storage engine that initiates storage of the plurality of join synopses obtained by the join synopsis determination engine, as the partial index table sample in the table sample storage device.

11. A method comprising:

receiving a request for an estimate size of a first compressed index associated with a first database index that is based on a database table;

obtaining a plurality of values indicating sizes of a plurality of second compressed indexes associated with a plurality of respective second database indexes other than the first database index, the second database indexes based on the database table;

determining, via a device processor, the estimate size of the first compressed database index based on one or more of the plurality of values;

determining a first set of table columns associated with the database table, the first database index being based on the first set of table columns;

determining that a compression associated with the requested estimate size associated with the first compressed index generates compressed indexes that share a common compressed size independent of an ordering of tuples associated with database table columns; and selecting one of the second database indexes that is, in common with the first database index, based on the first set of table columns, the determining the estimate size of the first compressed database index including deducing the estimate size of the first compressed database index based on the value indicating the size of the compressed index associated with the selected one of the second database indexes.

12. The method of claim 11, wherein:
the compression associated with the requested estimate size includes one or more of:

null suppression or global dictionary compression.

13. The method of claim 11, wherein:
the database table is included in a relational database system.

14. The method of claim 11, further comprising:

determining whether a database table sample associated with the database table is stored in a table sample storage device;

obtaining the database table sample, based on a first result of the determination of whether a database table sample associated with the database table is stored in a table sample storage device;

obtaining a random sample from the database table, based on a second result of the determination of whether a database table sample associated with the database table is stored in a table sample storage device, the random sample including a subset of rows included in the database table; and initiating storage of the random sample obtained from the database table, as the database table sample in the table sample storage device, wherein obtaining the plurality of values includes obtaining the plurality of values based on one or more compression fraction values associated with the obtained database table sample.

15. The method of claim 14, further comprising:

determining whether a partial index table sample associated with a database partial index associated with the database table is stored in the table sample storage device;

obtaining the partial index table sample, based on a first result of the determination of whether the partial index table sample is stored in the table sample storage device;

obtaining a filtered sample from the database table sample, based on a second result of the determination of whether the partial index table sample is stored in the table sample storage device; and initiating storage of the filtered sample, as the partial index table sample in the table sample storage device.

16. The method of claim 14, further comprising:

determining whether a materialized view sample associated with a materialized view associated with the database table is stored in the table sample storage device;

obtaining the materialized view sample, based on a first result of the determination of whether the materialized view table sample is stored in the table sample storage device;

obtaining a plurality of join synopses of a database associated with the database table, based on a second result of the determination of whether the partial index table sample is stored in the table sample storage device; and initiating storage of the plurality of join synopses, as the partial index table sample in the table sample storage device.

17. A method comprising:

receiving a request for an estimate size of a first compressed index associated with a first database index that is based on a database table;

obtaining a plurality of values indicating sizes of a plurality of second compressed indexes associated with a plurality of respective second database indexes other than the first database index, the second database indexes based on the database table;

determining, via a device processor, the estimate size of the first compressed database index based on one or more of the plurality of values;

determining a first set of table columns associated with the database table, wherein the first database index is based on the first set of table columns;

determining that a compression associated with the requested estimate size associated with the first compressed index generates compressed indexes that share a common compressed size independent of an ordering of tuples associated with database table columns; and selecting one or more of the second database indexes that are based on one or more of the table columns included in one or more subsets of the first set of table columns, the determining the estimate size of the first compressed database index including extrapolating the estimate size of the first compressed database index based on determining one or more size reduction values for each selected second database index, based on determining differences between the value indicating the size of the compressed index associated with the selected one of the second database indexes and a value indicating the size of the selected one of the second database indexes.

18. The method of claim 17, further comprising:

determining whether a database table sample associated with the database table is stored in a table sample storage device;

obtaining the database table sample, based on a first result of the determination of whether a database table sample associated with the database table is stored in a table sample storage device;

obtaining a random sample from the database table, based on a second result of the determination of whether a database table sample associated with the database table is stored in a table sample storage device, the random sample including a subset of rows included in the database table; and initiating storage of the random sample obtained from the database table, as the database table sample in the table sample storage device, wherein obtaining the plurality of values includes obtaining the plurality of values based on one or more compression fraction values associated with the obtained database table sample.

19. The method of claim 18, further comprising:

determining whether a partial index table sample associated with a database partial index associated with the database table is stored in the table sample storage device;

obtaining the partial index table sample, based on a first result of the determination of whether the partial index table sample is stored in the table sample storage device;

obtaining a filtered sample from the database table sample, based on a second result of the determination of whether the partial index table sample is stored in the table sample storage device; and initiating storage of the filtered sample, as the partial index table sample in the table sample storage device.

20. The method of claim 18, further comprising:

determining whether a materialized view sample associated with a materialized view associated with the database table is stored in the table sample storage device;

obtaining the materialized view sample, based on a first result of the determination of whether the materialized view table sample is stored in the table sample storage device;

obtaining a plurality of join synopses of a database associated with the database table, based on a second result of the determination of whether the partial index table sample is stored in the table sample storage device; and initiating storage of the plurality of join synopses, as the partial index table sample in the table sample storage device.

* * * * *